United States Patent
Kawakami et al.

(10) Patent No.: US 10,813,155 B2
(45) Date of Patent: Oct. 20, 2020

(54) WIRELESS COMMUNICATION APPARATUS AND WIRELESS COMMUNICATION METHOD FOR CONNECTION TO A WIRELESS NETWORK

(71) Applicant: SONY CORPORATION, Tokyo (JP)

(72) Inventors: Daisuke Kawakami, Kanagawa (JP); Hideyuki Suzuki, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/545,186

(22) PCT Filed: Nov. 5, 2015

(86) PCT No.: PCT/JP2015/081226
§ 371 (c)(1),
(2) Date: Jul. 20, 2017

(87) PCT Pub. No.: WO2016/125356
PCT Pub. Date: Aug. 11, 2016

(65) Prior Publication Data
US 2017/0359846 A1    Dec. 14, 2017

(30) Foreign Application Priority Data
Feb. 6, 2015   (JP) ................. 2015-022448

(51) Int. Cl.
*H04W 88/06* (2009.01)
*H04W 76/15* (2018.01)
(Continued)

(52) U.S. Cl.
CPC .......... *H04W 76/15* (2018.02); *H04W 76/10* (2018.02); *H04W 88/04* (2013.01); *H04W 88/06* (2013.01)

(58) Field of Classification Search
CPC ... H04W 74/002; H04W 76/15; H04W 76/16; H04W 88/04; H04W 88/06; H04W 48/10; H04W 48/18; H04W 48/20
See application file for complete search history.

(56) References Cited

U.S. PATENT DOCUMENTS 8,493,935 B2 * 7/2013 Zisimopoulos ....... H04W 48/16
                                                          370/254
8,917,708 B2  12/2014 Venkatachalam et al.
(Continued)

FOREIGN PATENT DOCUMENTS

AU    2008347702 A1   7/2009
BR    PI0822176 A2    6/2015
(Continued)

OTHER PUBLICATIONS

International Search Report and Written Opinion of PCT Application No. PCT/JP2015/081226, dated Dec. 8, 2015, 01 pages of English Translation and 06 pages of ISRWO.
(Continued)

*Primary Examiner* — Hoang-Chuong Q Vu
(74) *Attorney, Agent, or Firm* — Chip Law Group

(57) ABSTRACT

[Object] To provide a wireless communication apparatus, a wireless communication method, and a program being novel and improved by which connection to a network can be made more easily.

[Solution] A wireless communication apparatus including: a first wireless communication unit configured to connect to a first network to perform wireless communication; and a control unit configured to assist connection, to a second network corresponding to a connection destination selection policy of another wireless communication apparatus
(Continued)

received by the first wireless communication unit, by a wireless terminal related to the other wireless communication apparatus.

19 Claims, 15 Drawing Sheets

(51) Int. Cl.
*H04W 76/10* (2018.01)
*H04W 88/04* (2009.01)

(56) References Cited

U.S. PATENT DOCUMENTS

| | | | | |
|---|---|---|---|---|
| 9,241,305 | B2* | 1/2016 | Cui | H04W 52/0241 |
| 2006/0128362 | A1* | 6/2006 | Bae | H04L 63/08 |
| | | | | 455/411 |
| 2006/0193295 | A1* | 8/2006 | White | H04L 12/5692 |
| | | | | 370/336 |
| 2009/0073943 | A1* | 3/2009 | Krishnaswamy | H04W 88/04 |
| | | | | 370/338 |
| 2009/0180449 | A1 | 7/2009 | Maki | |
| 2009/0305671 | A1* | 12/2009 | Luft | G06Q 30/0205 |
| | | | | 455/411 |
| 2010/0061294 | A1* | 3/2010 | Proctor, Jr. | G06Q 30/0226 |
| | | | | 370/328 |
| 2010/0115113 | A1* | 5/2010 | Short | H04L 63/08 |
| | | | | 709/228 |
| 2012/0008612 | A1 | 1/2012 | Maki | |
| 2012/0257610 | A1 | 10/2012 | Maki et al. | |
| 2013/0097418 | A1* | 4/2013 | Bhatt | H04L 63/0892 |
| | | | | 713/151 |
| 2013/0121197 | A1 | 5/2013 | Maki | |
| 2013/0237148 | A1* | 9/2013 | McCann | H04W 4/02 |
| | | | | 455/41.1 |
| 2013/0318161 | A1* | 11/2013 | Sakamoto | H04L 12/1818 |
| | | | | 709/204 |
| 2014/0007209 | A1 | 1/2014 | Zucker | |
| 2014/0071895 | A1* | 3/2014 | Bane | H04L 69/321 |
| | | | | 370/328 |
| 2014/0092885 | A1 | 4/2014 | Venkatachalam et al. | |
| 2014/0092888 | A1 | 4/2014 | Maki | |
| 2014/0195654 | A1 | 7/2014 | Kiukkonen et al. | |
| 2014/0215583 | A1* | 7/2014 | Ding | H04W 12/06 |
| | | | | 726/5 |
| 2014/0247807 | A1* | 9/2014 | Westerberg | H04W 36/34 |
| | | | | 370/331 |
| 2014/0286159 | A1* | 9/2014 | Etemad | H04W 36/14 |
| | | | | 370/230 |
| 2015/0110052 | A1 | 4/2015 | Venkatachalam et al. | |
| 2015/0282021 | A1* | 10/2015 | Pao | H04W 36/0066 |
| | | | | 370/331 |
| 2015/0334724 | A1* | 11/2015 | Faccin | H04W 76/36 |
| | | | | 370/235 |
| 2016/0037581 | A1 | 2/2016 | Maki | |
| 2016/0127381 | A1* | 5/2016 | Zhong | H04W 76/10 |
| | | | | 726/4 |
| 2016/0183125 | A1* | 6/2016 | Sun | H04W 28/08 |
| | | | | 455/453 |
| 2016/0198398 | A1* | 7/2016 | Chen | H04W 48/18 |
| | | | | 370/329 |
| 2017/0048742 | A1 | 2/2017 | Maki | |
| 2017/0111938 | A1* | 4/2017 | Gao | H04L 67/34 |
| 2017/0118787 | A1* | 4/2017 | Kekki | H04W 76/16 |
| 2018/0167840 | A1 | 6/2018 | Maki | |
| 2020/0154303 | A1 | 5/2020 | Maki | |

FOREIGN PATENT DOCUMENTS

| | | |
|---|---|---|
| CN | 101939951 A | 1/2011 |
| CN | 104604298 A | 5/2015 |
| CN | 105453656 A | 3/2016 |
| CN | 110225506 A | 9/2019 |
| CN | 110267328 A | 9/2019 |
| DE | 202008017951 U1 | 3/2011 |
| EP | 2238715 A1 | 10/2010 |
| EP | 2901764 A1 | 8/2015 |
| EP | 3028507 A1 | 6/2016 |
| EP | 3634043 A1 | 4/2020 |
| ES | 2350301 T1 | 1/2011 |
| GB | 2516886 A | 2/2015 |
| HK | 1210355 A1 | 4/2016 |
| JP | 2004-235890 A | 8/2004 |
| JP | 2005-530444 A | 10/2005 |
| JP | 2011-029990 A | 2/2011 |
| JP | 2012-039584 A | 2/2012 |
| JP | 5031905 B2 | 9/2012 |
| JP | 2014-027537 A | 2/2014 |
| JP | 2014-078866 A | 5/2014 |
| JP | 5580349 B2 | 8/2014 |
| JP | 2014-524073 A | 9/2014 |
| JP | 2014-222929 A | 11/2014 |
| JP | 6034496 B2 | 11/2016 |
| JP | 6191849 B2 | 9/2017 |
| JP | 2017-200246 A | 11/2017 |
| JP | 6301429 B2 | 3/2018 |
| JP | 2020-017990 A | 1/2020 |
| KR | 10-2010-0119540 A | 11/2010 |
| KR | 10-2015-0038329 A | 4/2015 |
| KR | 10-2016-0024397 A | 3/2016 |
| KR | 10-2016-0137687 A | 11/2016 |
| WO | 2008/117414 A1 | 10/2008 |
| WO | 2009/090295 A1 | 7/2009 |
| WO | 2014/051790 A1 | 4/2014 |
| WO | 2015/016138 A1 | 2/2015 |

OTHER PUBLICATIONS

Extended European Search Report of EP Patent Application No. 15881173.7, dated Dec. 13, 2018, 13 pages.
3rd Generation Partnership Project; Technical Specification Group Services and System Aspects; 3GPP system to Wireless Local Area Network (WLAN) interworking; System description (Release 11), 3GPPTS23.234, Sep. 2012, 84 pages.
"3rd Generation Partnership Project;Technical Specification Group Services and System Aspects; 3G Security; Wireless Local Area Network (WLAN) interworking security (Release 12)", 3GPPTS23.234, Dec. 2013, 98 pages.
"SIM access via 'SIM Access Profile' and Bluetooth link", 3GPP TSG SA WG3 Security-S3#29, S3-030436, Jul. 15-18, 2013, 64 pages.
Office Action for JP Patent Application No. 2016-573183, dated Nov. 19, 2019, 03 pages of Office Action and 03 pages of English Translation.
Office Action for JP Patent Application No. 2016-573183, dated Aug. 27, 2019, 04 pages of Office Action and 03 pages of English Translation.
Extended European Search Report of EP Application No. 20172064.6, dated Jul. 6, 2020, 12 pages.
"3rd Generation Partnership Project; Technical Specification Group Services and System Aspects; 3GPP system to Wireless Local Area Network (WLAN) interworking; System description (Release 11)", 3GPP Standard; 3GPP TS 23.234, vol. SA WG2, No. V11.0.0, XP050649114, Sep. 17, 2012, 84 Pages.
"3rd Generation Partnership Project; Technical Specification Group Services and System Aspects; 3G Security; Wireless Local Area Network (WLAN) interworking security (Release 12)", 3GPP Draft; 33234-000, XP050766307, No. V12.0.0, Dec. 12, 2013, 98 Pages.
"SIM access via 'SIM Access Profile' and Bluetooth link", 3GPP Draft; S3-030436, vol. SA WG3, No. San Francisco, USA, Ericsson, Jul. 15-18, 2003, 64 Pages.

* cited by examiner

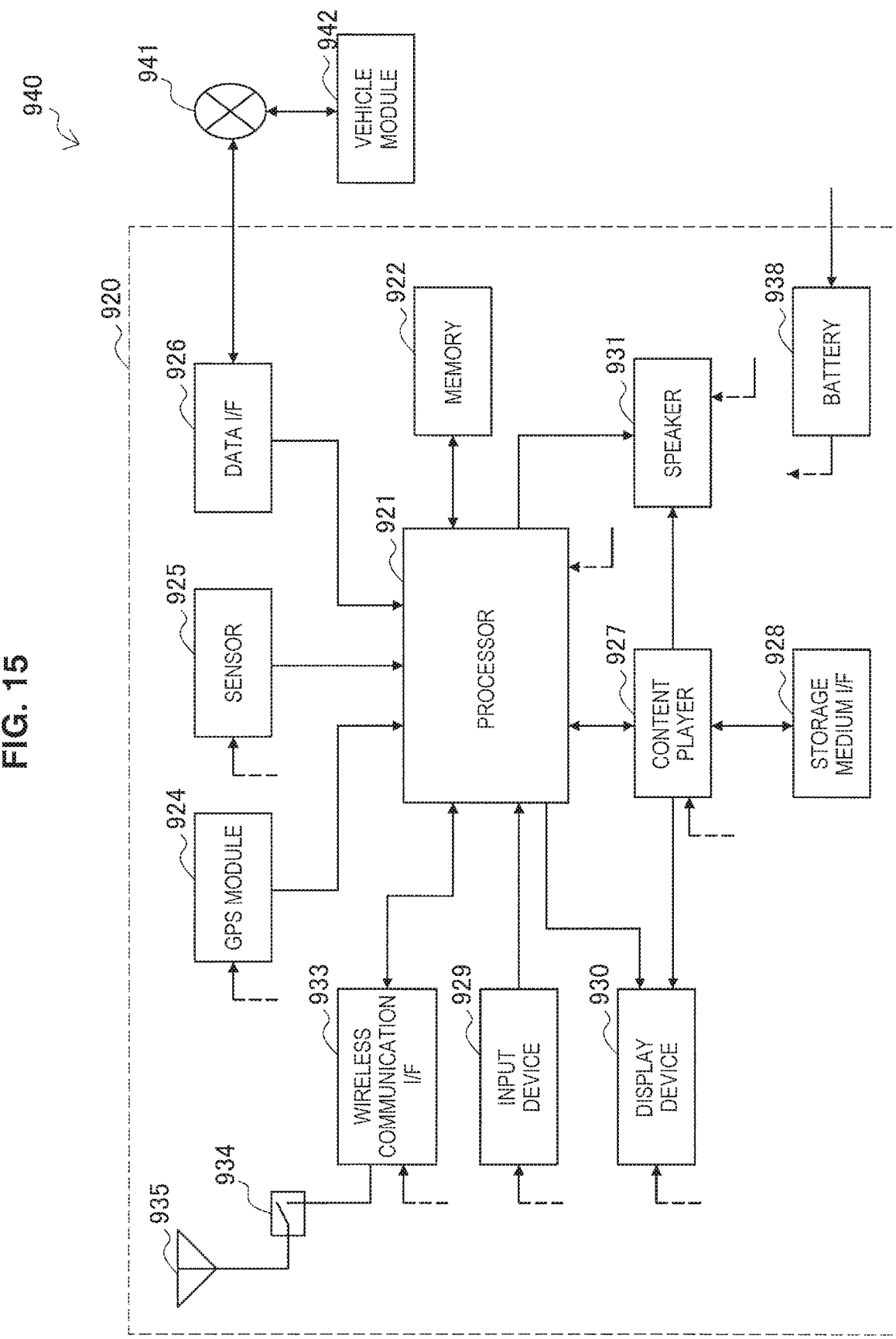

WIRELESS COMMUNICATION APPARATUS AND WIRELESS COMMUNICATION METHOD FOR CONNECTION TO A WIRELESS NETWORK

CROSS REFERENCE TO RELATED APPLICATIONS

This application is a U.S. National Phase of International Patent Application No. PCT/JP2015/081226 filed on Nov. 5, 2015, which claims priority benefit of Japanese Patent Application No. JP 2015-022448 filed in the Japan Patent Office on Feb. 6, 2015. Each of the above-referenced applications is hereby incorporated herein by reference in its entirety.

TECHNICAL FIELD

The present disclosure relates to a wireless communication apparatus, a wireless communication method, and a program.

BACKGROUND ART

Recent years have seen various services using the Internet, and means for easily accessing the Internet even away from home have been demanded. For example, terminals with a wireless wide area network (WWAN) communication function, such as smartphones and mobile phones, can access the Internet via a mobile communication network even away from home. On the other hand, terminals without a WWAN communication function are required to access the Internet using other communication schemes, such as wireless local area network (WLAN). Connecting to a network (e.g., WLAN) may require processes such as searching for an access point and inputting an identifier (ID) and a password, which leads to demands for technologies for facilitating such processes.

Here, in a case where direct communication between apparatuses cannot be performed easily, there is a technology of enabling communication between the apparatuses by interposing a relay station. For example, Patent Literature 1 below discloses a technology of operating, as a relay station, a mobile station selected from among a plurality of mobile stations on the basis of received power or reception quality to relay communication by another mobile station.

CITATION LIST

Patent Literature

Patent Literature 1: JP 2011-29990A

DISCLOSURE OF INVENTION

Technical Problem

There is so-called tethering as a technology of enabling access to the Internet by relaying communication by another wireless terminal by a relay station as disclosed in the above-described Patent Literature 1. In tethering, however, there are various restrictions in which, for example, a terminal to be operated as a master device for tethering is generally limited to a terminal used by an identical user, so that access to the Internet by the terminal may not be performed easily.

Therefore, the present disclosure proposes a wireless communication apparatus, a wireless communication method, and a program being novel and improved by which connection to a network can be made more easily.

Solution to Problem

According to the present disclosure, there is provided a wireless communication apparatus including: a first wireless communication unit configured to connect to a first network to perform wireless communication; and a control unit configured to assist connection, to a second network corresponding to a connection destination selection policy of another wireless communication apparatus received by the first wireless communication unit, by a wireless terminal related to the other wireless communication apparatus.

Further, according to the present disclosure, there is provided a wireless communication apparatus including: a first wireless communication unit configured to connect to a first network to perform wireless communication; and a control unit configured to control the first wireless communication unit to transmit a connection destination selection policy via the first network to another wireless communication apparatus that assists connection to a second network by a wireless terminal related to the other wireless communication apparatus.

Further, according to the present disclosure, there is provided a wireless communication method including: with a wireless communication apparatus configured to connect to a first network to perform wireless communication, assisting connection, to a second network corresponding to a received connection destination selection policy of another wireless communication apparatus, by a wireless terminal related to the other wireless communication apparatus.

Further, according to the present disclosure, there is provided a wireless communication method including: with a wireless communication apparatus configured to connect to a first network to perform wireless communication, transmitting a connection destination selection policy via the first network to another wireless communication apparatus that assists connection to a second network by a wireless terminal related to the other wireless communication apparatus.

Further, according to the present disclosure, there is provided a program for causing a computer to function as: a first wireless communication unit configured to connect to a first network to perform wireless communication; and a control unit configured to assist connection, to a second network corresponding to a connection destination selection policy of another wireless communication apparatus received by the first wireless communication unit, by a wireless terminal related to the other wireless communication apparatus.

Further, according to the present disclosure, there is provided a program for causing a computer to function as: a first wireless communication unit configured to connect to a first network to perform wireless communication; and a control unit configured to control the first wireless communication unit to transmit a connection destination selection policy via the first network to another wireless communication apparatus that assists connection to a second network by a wireless terminal related to the other wireless communication apparatus.

Advantageous Effects of Invention

As described above, according to the present disclosure, connection to a network can be made more easily. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a block diagram illustrating an example of a schematic configuration of a car navigation apparatus.

MODE(S) FOR CARRYING OUT THE INVENTION

Figure 1:
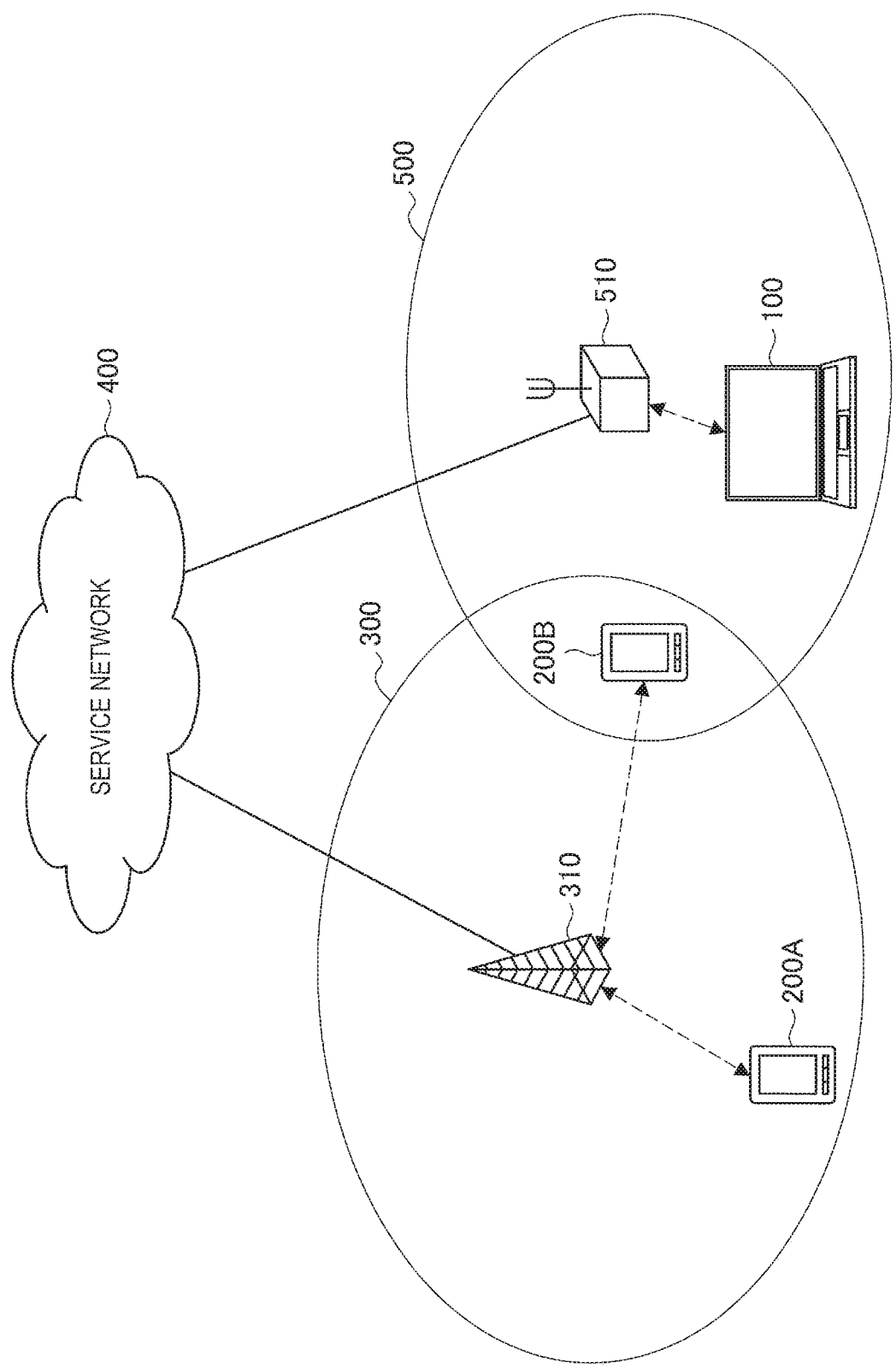
FIG. 1 is a view for explaining an overview of a wireless communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same reference sign. For example, multiple elements having substantially the same function and structure are distinguished as WWAN terminals 200A, 200B, and 200C as necessary. On the other hand, when it is not necessary to particularly distinguish each of multiple elements having substantially the same function and structure, only the same reference sign will be given. For example, when it is not necessary to particularly distinguish among the WWAN terminals 200A, 200B, and 200C, the WWAN terminals 200A, 200B, and 200C will be simply designated the WWAN terminal 200.

Note that description will be provided in the following order.
1. Overview
1. 1. Schematic system configuration
1. 2. Technical problems
2. Configuration examples
2. 1. Configuration example of wireless communication system
2. 2. Configuration example of WLAN terminal
2. 3. Configuration example of WWAN terminal
3. Technical features
4. Example of operation and process
5. Applications
6. Conclusion 1. Overview <1.1. Schematic system configuration>

First, referring to FIG. 1 and FIG. 2, an overview of a wireless communication system 1 according to an embodiment of the present disclosure will be described.

Figure 2:
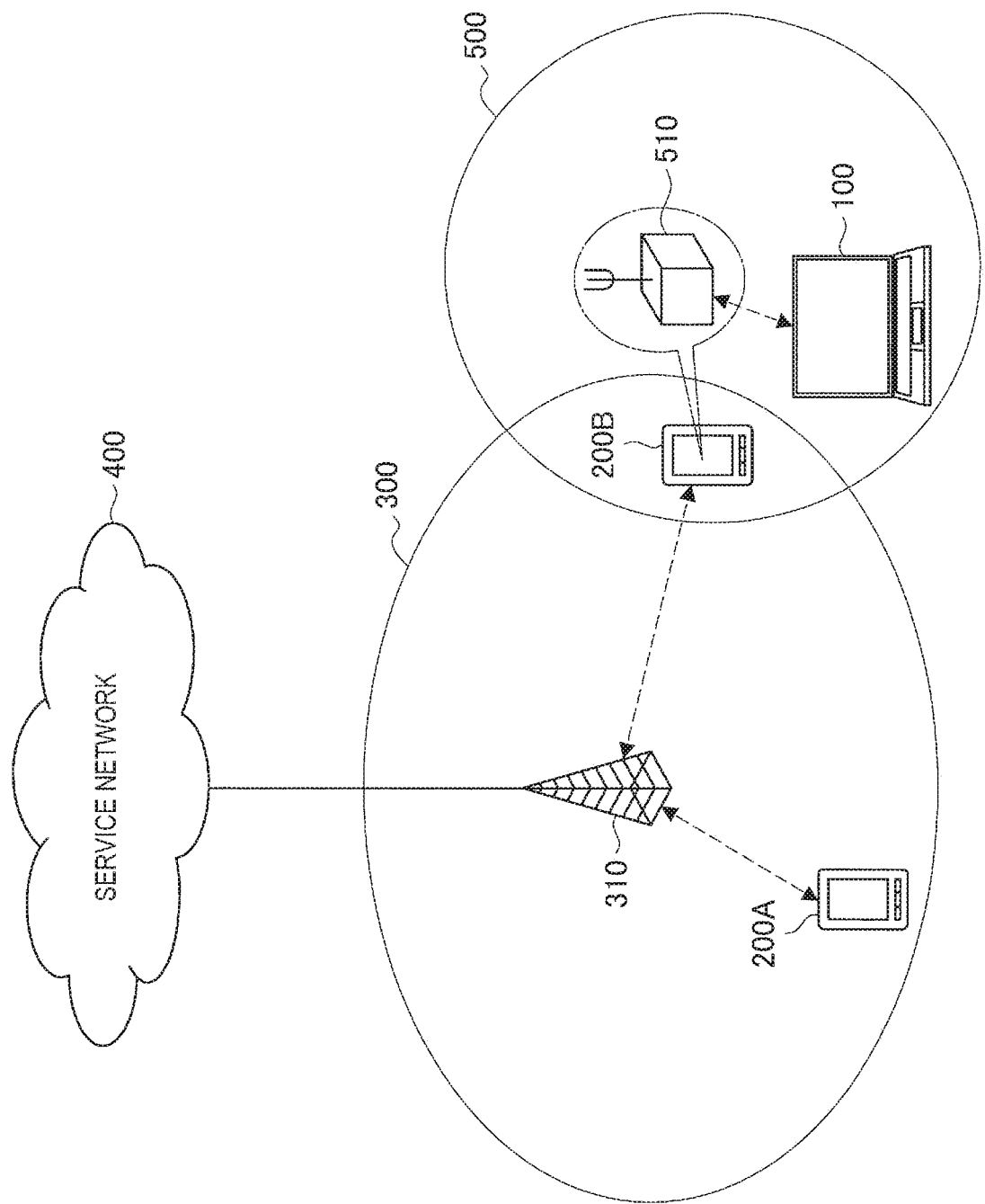
FIG. 2 is a view for explaining an overview of a wireless communication system according to an embodiment of the present disclosure.

FIG. 1 and FIG. 2 are views for explaining an overview of the wireless communication system 1 according to an embodiment of the present disclosure. In the example illustrated in FIG. 1 and FIG. 2, the wireless communication system 1 includes a wireless communication apparatus 100 and wireless communication apparatuses 200 (200A and 200B).

The wireless communication apparatus 100 is a wireless terminal capable of wirelessly communicating with another apparatus. In the example of FIG. 1 and FIG. 2, the wireless communication apparatus 100 is a notebook PC. The wireless communication apparatus 100 is a WLAN terminal that can connect to a WLAN according to a communication scheme, such as Institute of Electrical and Electronics Engineers (IEEE) 802.11a, 11b, 11g, 11n, 11ac, or 11ad. As illustrated in FIG. 1, the WLAN terminal 100 can connect to a wireless network 500 via a base station 510, and use a service provided by a service network 400. In addition, the WLAN terminal 100 can establish wireless connection with the wireless communication apparatus 200. This wireless connection can be established according to any communication scheme, such as Bluetooth (registered trademark) or near field communication (NFC). The WLAN terminal 100 can connect to a WLAN whose network information is known, such as a WLAN operated at a user's home, for example, but cannot easily connect to a WLAN whose network information is unknown, such as a WLAN away from home. Note that the wireless communication apparatus 100 may be implemented as, as well as a notebook PC, a PC, a tablet terminal, personal digital assistants (PDA), a head mounted display (HMD), a headset, a digital camera, a digital video camera, a smartphone, a mobile phone terminal, a portable music player, a portable video processor, or a portable game device.

The wireless communication apparatus 200 is a wireless terminal capable of wirelessly communicating with another apparatus. In the example of FIG. 1 and FIG. 2, the wireless communication apparatus 200 is a smartphone. The wireless communication apparatus 200 can establish wireless connection with the WLAN terminal 100, for example. In addition, the wireless communication apparatus 200 is a WWAN terminal that has a WWAN communication function and can connect to a WWAN. The WWAN terminal 200 has subscriber identification information for connection to a mobile communication network, and performs an authentication process using the subscriber identification information to establish wireless connection with a wireless network 300 (e.g., mobile communication network). The subscriber identification information is, for example, international mobile subscriber identity (IMSI) stored in a subscriber identity module card (SIM card). The WWAN terminal 200 can connect to the wireless network 300 using the WWAN communication function, and use a service provided by a service network 400. Note that the wireless communication apparatus 200 may be implemented as, as well as a smartphone, a notebook PC, a PC, a tablet terminal, PDA, a HIVID, a headset, a digital camera, a digital video camera, a mobile phone terminal, a portable music player, a portable video processor, or a portable game device.

Here, it is assumed that the WWAN terminal 200A is a terminal related to the WLAN terminal 100. For example, the WWAN terminal 200A may be previously subjected to association, such as pairing with the WLAN terminal 100. For example, the WWAN terminal 200A is used by a user identical to the user of the WLAN terminal 100. On the other hand, it is assumed that the WWAN terminal 200B is a terminal not related to the WLAN terminal 100. For example, the WWAN terminal 200B is used by a user different from the user of the WLAN terminal 100.

The wireless network 300 is a WWAN (first network), such as a mobile communication network. For example, the WWAN 300 is operated according to any wireless communication scheme, such as Long Term Evolution (LTE), LTE-Advanced (LTE-A), GSM (registered trademark), UMTS, W-CDMA, or CDMA2000. For example, the wireless communication apparatus 200 located within a range of a cell operated by a base station 310 connects to the WWAN 300.

The service network 400 is a public network, such as the Internet. The WWAN terminal 200 can access the service network 400 via the WWAN 300.

Here, a terminal without a WWAN communication function cannot easily access the Internet via the WWAN 300. Even in such as case, as a means of accessing the Internet away from home, for example, tethering by a terminal capable of WWAN communication may be performed, or a public WLAN may be used, for example.

Tethering is a technology in which, via a terminal with a WWAN communication function, such as a smartphone, another communication terminal connects to a WWAN 300. For example, the WWAN terminal 200 is connectable to the WWAN 300 and the WLAN terminal 100, therefore, the WWAN terminal 200 can serve as an access point that relays communication between the WWAN 300 and the WLAN terminal 100, thus enabling tethering. This allows the WLAN terminal 100 to use a service provided by the service network 400.

Tethering is available regardless of where the WWAN terminal 200 is located in a WWAN communication available area. However, terminal setting for using tethering is required to be performed in both the WWAN terminal 200 and the WLAN terminal 100, which leads to poor user convenience. Moreover, during tethering, the WWAN terminal 200 serving as an access point consumes a large amount of power.

Meanwhile, a public WLAN is a service that provides connection to the Internet using a WLAN. A wireless network 500 is a public network (second network) operated by a WLAN, for example. The WLAN terminal 100 can connect to the WLAN 500 to access the service network 400, or to access the service network 400 further via the WWAN 300. This allows the WLAN terminal 100 to use a service provided by the service network 400. Note that, in the example illustrated in FIG. 1, the WLAN 500 is operated by the base station 510, and in the example illustrated in FIG. 2, the WLAN 500 is operated by the WWAN terminal 200B serving as the base station 510.

<1.2. Technical Problems>

Here, a wireless terminal with a WWAN communication function, such as a smartphone, can connect to a surrounding public WLAN and perform user authentication using its own subscriber identification information, by using a technology of access network discovery and selection function (ANDSF) proposed by Third Generation Partnership Project (3GPP) or Wi-Fi CERTIFIED Passpoint proposed by Wi-Fi Alliance. However, a wireless terminal without a WWAN communication function, like a notebook PC, not having subscriber identification information, may require a user to select an available public WLAN for oneself and perform an authentication procedure, which leads to poor convenience.

Meanwhile, the WLAN terminal 100 can access the Internet by operating the WWAN terminal 200A in the tethering mode. However, the WLAN terminal 100 cannot use the Internet easily in a case where the WWAN terminal 200A is not adaptable to the tethering mode or in a case where restrictions are imposed on the data communication speed or data traffic even if the WWAN terminal 200A is adaptable to tethering. In addition, the WWAN terminal 200B cannot be operated easily in the tethering mode for the WLAN terminal 100 since the WWAN terminal 200B is used by a different user, for example.

Therefore, using the above-described circumstances as a viewpoint, a wireless communication apparatus according to an embodiment of the present disclosure has been created. The wireless communication apparatus according to an embodiment of the present disclosure is capable of connecting to a network more easily. Specifically, an embodiment of the present disclosure provides a mechanism in which the WLAN terminal 100 is capable of connecting to the Internet with involvement of the WWAN terminal 200B used by another user. For example, in FIG. 1, the WWAN terminal 200B assists an authentication process to the WLAN 500 by the WLAN terminal 100. On the other hand, in FIG. 2, the WWAN terminal 200B, by serving as the base station 510 for oneself, assists connection to the WLAN 500 by the WLAN terminal 100.

Hereinafter, referring to FIG. 3 to FIG. 15, a wireless communication system including a wireless communication apparatus according to an embodiment of the present disclosure will be described in detail.

2. Configuration Examples

<2.1. Configuration Example of Wireless Communication System>

Figure 3:
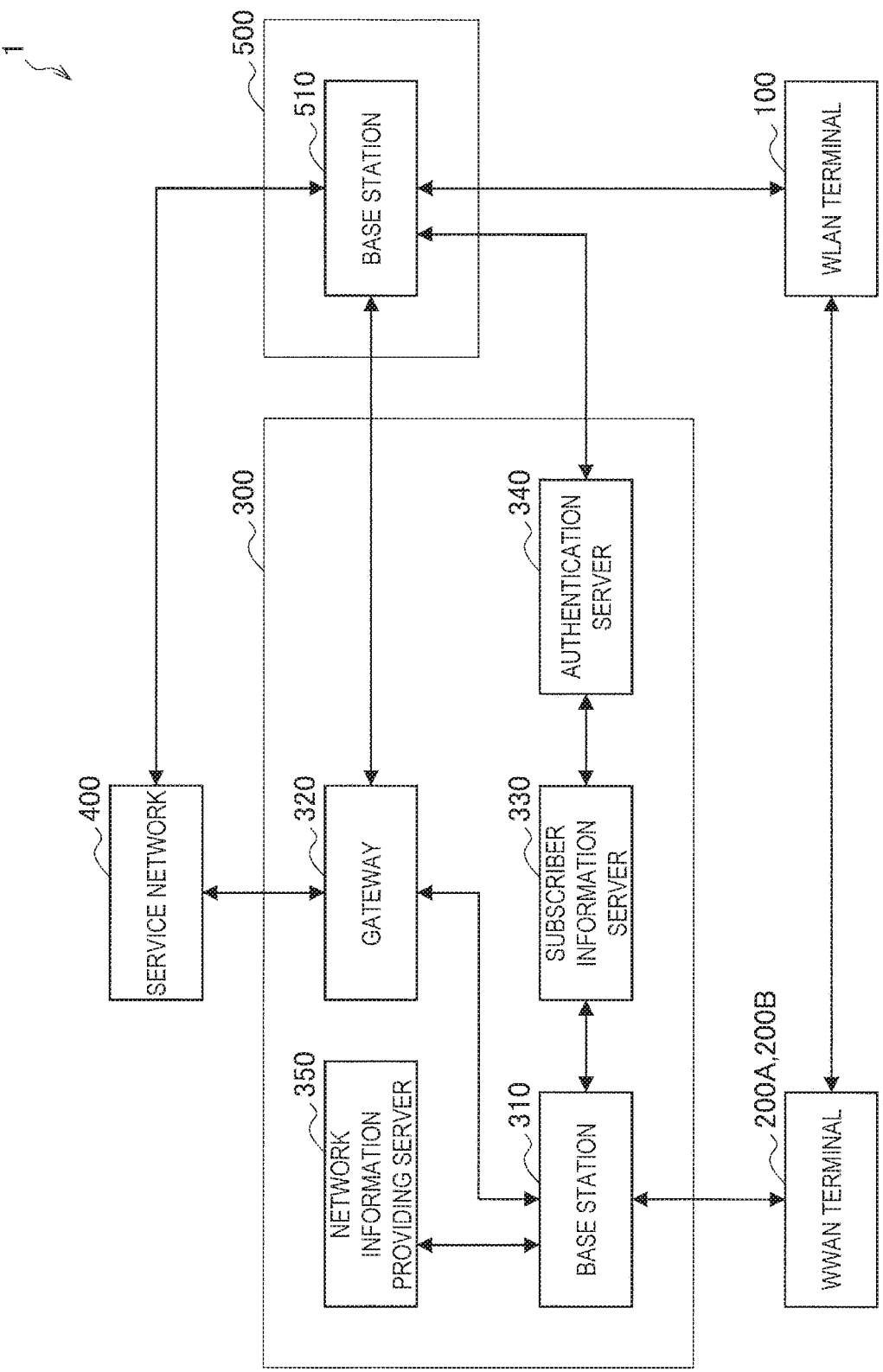
FIG. 3 is a block diagram illustrating an example of a configuration of a wireless communication system according to the present embodiment.
Figure 4:
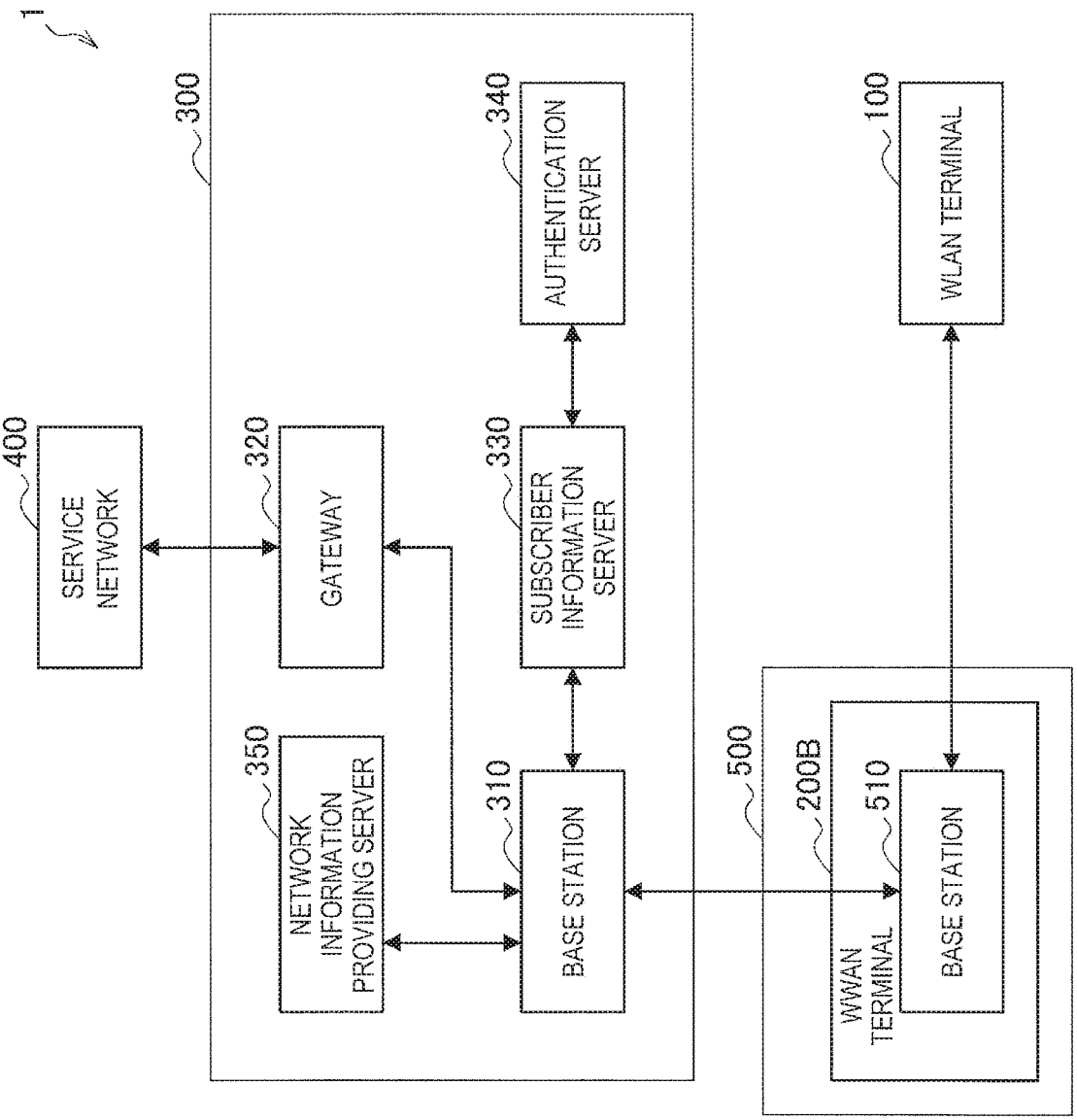
FIG. 4 is a block diagram illustrating an example of a configuration of a wireless communication system according to the present embodiment.

FIG. 3 and FIG. 4 are block diagrams illustrating an example of a configuration of the wireless communication system 1 according to the present embodiment. As shown in FIG. 3 and FIG. 4, the wireless communication system 1 includes the WLAN terminal 100 and the WWAN terminal 200, and provides wireless communication to the WWAN 300, the WLAN 500, and the service network 400. Note that FIG. 3 is a configuration example corresponding to FIG. 1, and FIG. 4 is a configuration example corresponding to FIG. 2. Note that illustration of the WWAN terminal 200A is omitted in FIG. 4 as it is similar to the configuration shown in FIG. 3.

(1) WWAN 300

As illustrated in FIG. 3 and FIG. 4, the WWAN 300 is operated by the base station 310, a gateway 320, a subscriber information server 330, an authentication server 340, and a network information providing server 350.

(1-1) Base Station 310

The base station 310 serves as a contact when a wireless terminal with a WWAN communication function connects to the WWAN 300. For example, the base station 310 accepts connection from the WWAN terminal 200. In LTE, the base station 310 corresponds to an eNB.

(1-2) Gateway 320

The gateway 320 relays communication between the WWAN 300 and another network. For example, the gateway 320 relays communication between the WWAN 300 and the service network 400, and communication between the WWAN 300 and the WLAN 500. In LTE, the gateway 320 corresponds to a packet data network gateway (P-GW).

(1-3) Subscriber Information Server 330

The subscriber information server 330 retains subscriber information for the WWAN 300. The subscriber information server 330 also retains information used for an authentication process when a wireless terminal connects to the WWAN 300. In LTE, the subscriber information server 330 corresponds to a home subscriber server (HSS).

(1-4) Authentication Server 340

The authentication server 340 authenticates that connection to the WWAN 300 is connection by a subscriber of the WWAN 300. The authentication server 340 may perform this authentication process referring to the subscriber information server 330. In LTE, the authentication server 340 corresponds to an authentication, authorization and accounting (AAA) server.

Moreover, the authentication server 340 has a function of authenticating connection to the WLAN 500. For example, as an authentication protocol to the WLAN 500, an authentication protocol by means of subscriber identification information to the WWAN 300, such as extensible authentication protocol (EAP)-AKA, EAP-SIM, or EAP-AKA', may be employed. In that case, the authentication server 340 performs an authentication process referring to the subscriber information server 330. Note that a terminal with the WWAN communication function capable of connecting to the WWAN 300 through an authentication process by means of subscriber identification information is capable of connecting to the WLAN 500 likewise through an authentication process by means of subscriber identification information.

(1-5) Network Information Providing Server 350

The network information providing server 350 provides information on a wireless network that is a connection destination, which is needed in switching a connection destination from a wireless network to which a wireless terminal is connected currently to another wireless network. For example, the network information providing server 350 may provide the WWAN terminal 200 with network information for connecting to the WLAN 500. In LTE, the network information providing server 350 corresponds to an ANDSF server.

(2) WLAN 500

The WLAN 500 is a public network operated by a base station 510. In this specification, a communication scheme of the public network is described to be WLAN, but the public network may be operated according to any other communication scheme, such as Bluetooth.

The base station 510 serves as a contact when a wireless terminal with a WLAN communication function connects to the WLAN 500. For example, the base station 510 accepts connection from the WLAN terminal 100. In the case where a communication scheme of the public network is WLAN, the base station 510 corresponds to an access point. Note that the base station 510 may support one or more authentication protocols. In the example illustrated in FIG. 3, the WLAN 500 is operated by the base station 510. On the other hand, in the example illustrated in FIG. 4, the WLAN 500 is operated by the WWAN terminal 200B serving as the base station 510.

<2.2. Configuration Example of WLAN Terminal>

Figure 5:
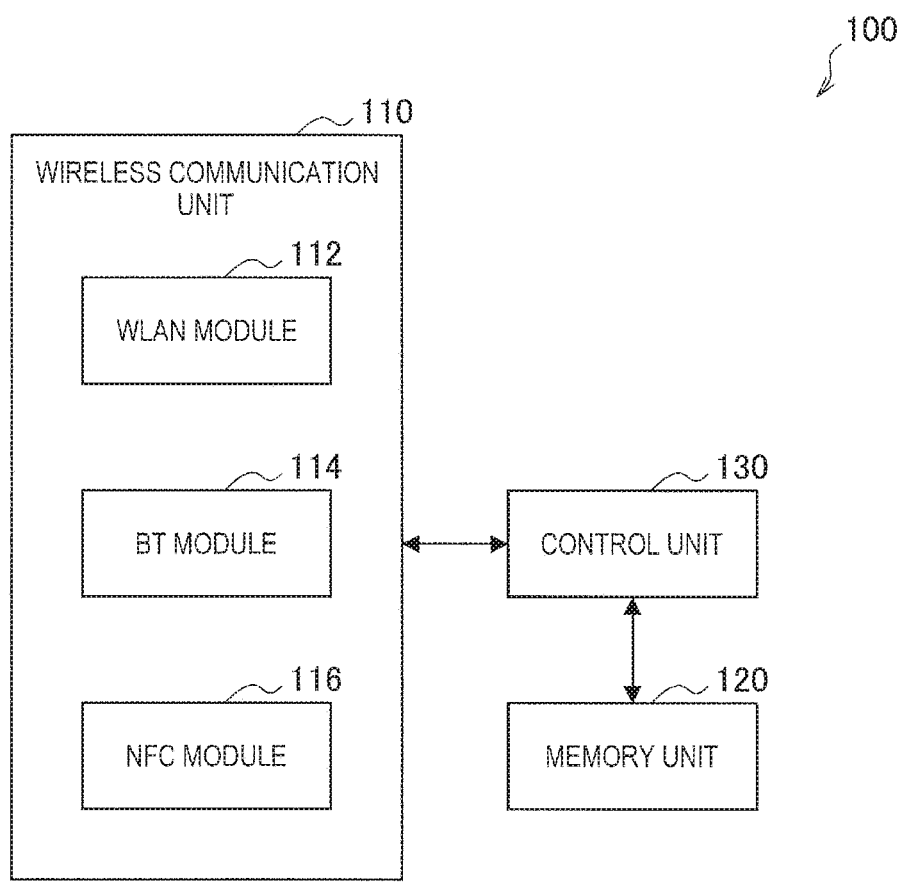
FIG. 5 is a block diagram illustrating an example of a logical configuration of a WLAN terminal according to the present embodiment.

FIG. 5 is a block diagram illustrating an example of a logical configuration of the WLAN terminal 100 according to the present embodiment. As illustrated in FIG. 5, the WLAN terminal 100 includes a wireless communication unit 110, a memory unit 120, and a control unit 130.

(1) Wireless Communication Unit 110

The wireless communication unit 110 is a communication module that transmits and receives data to/from an external device. The wireless communication unit 110 can perform wireless communication using various communication schemes. For example, the wireless communication unit 110 includes a WLAN module 112 and is capable of wireless communication using Wi-Fi (registered trademark), or WLAN. The wireless communication unit 110 also includes a Bluetooth (BT) module 114 and is capable of wireless communication using Bluetooth. The wireless communication unit 110 also includes an NFC module 116 and is capable of wireless communication using NFC.

For example, the wireless communication unit 110 performs wireless communication with the WWAN terminal 200. For example, the wireless communication unit 110 may perform wireless communication with the WWAN terminal 200 by using a near field wireless communication scheme, such as NFC, Bluetooth, Bluetooth low energy, Wi-Fi direct (registered trademark), WLAN, or the like. Besides, the wireless communication unit 110 may perform wireless communication with the WWAN terminal 200 by using a near field wireless communication scheme, such as ZigBee (registered trademark), infrared data association (IrDA), or the like.

For example, the wireless communication unit 110 connects to a public network to perform wireless communication. For example, the wireless communication unit 110 connects to the WLAN 500 using a wireless communication scheme, such as WLAN. The public network may support any wireless communication scheme other than WLAN, and in that case, the wireless communication unit 110 may connect to the public network using a wireless communication scheme corresponding to the public network. The wireless communication unit 110 may also perform a measurement process of, for example, measuring a received signal strength indicator (RSSI) from the intensity of a signal received from the WLAN 500.

The wireless communication unit 110 may perform wireless communication with the WWLAN terminal 200 and a public network by using the same communication scheme. For example, the wireless communication unit 110 may communicate with the WWAN terminal 200 by using a WLAN and connect to the WLAN 500.

(2) Memory Unit 120

The memory unit 120 performs recording and reproduction of data on a predetermined recording medium. For example, the memory unit 120 may store a connection destination selection policy shared with the WWAN terminal 200A.

(3) Control Unit 130

The control unit 130 serves as an arithmetic processor and a controller, and controls the overall operation in the WLAN terminal 100 according to various programs. For example, the control unit 130 performs various processes for connecting to the WLAN 500 on the basis of assistance by the WWAN terminal 200B.

A configuration example of the WLAN terminal 100 according to the present embodiment has been described above. Subsequently, a configuration example of the WWAN terminal 200 according to the present embodiment will be described with reference to FIG. 6.

<2.3. Configuration Example of WWAN Terminal>

Figure 6:
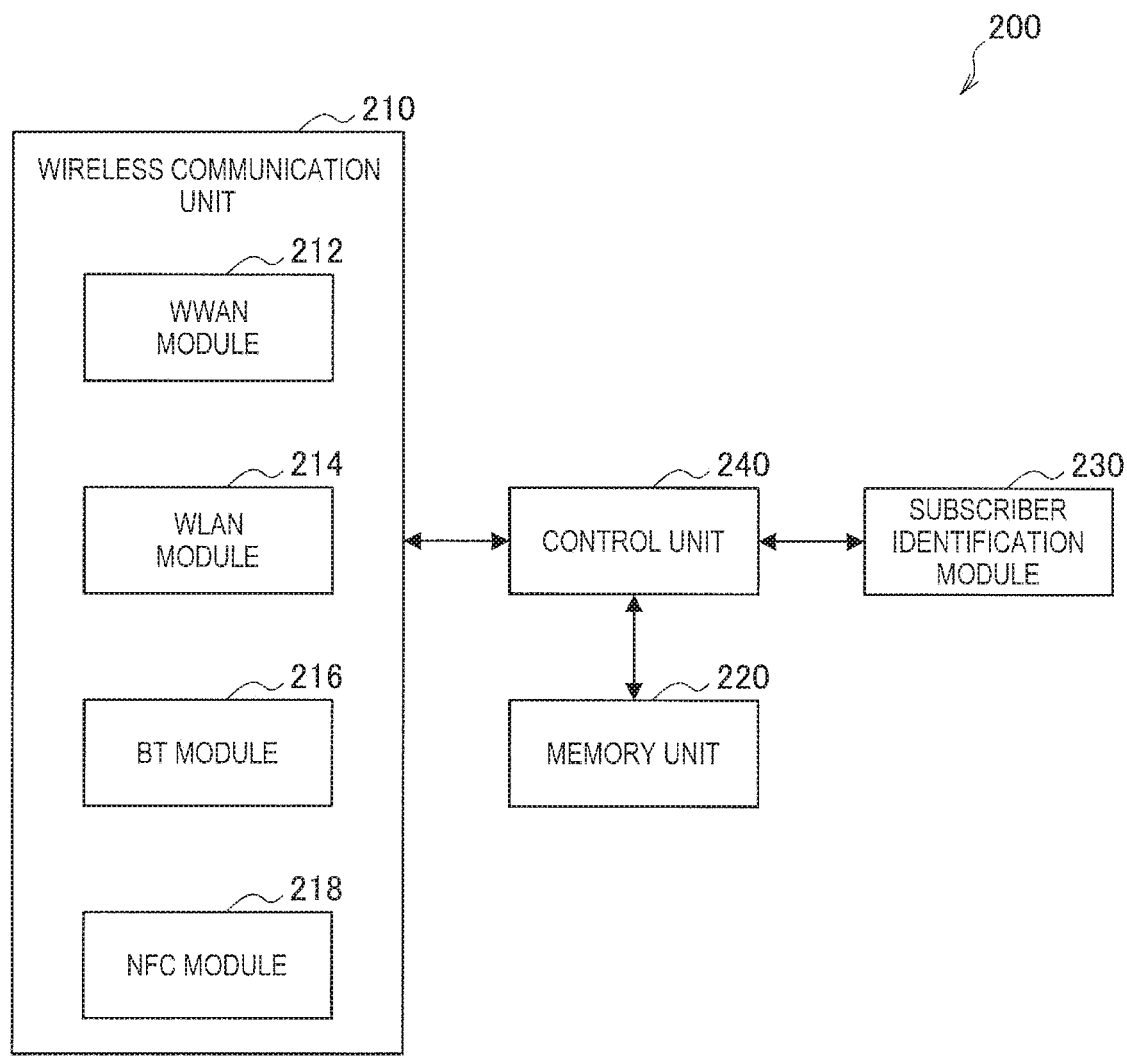
FIG. 6 is a block diagram illustrating an example of a logical configuration of a WWAN terminal according to the present embodiment.

FIG. 6 is a block diagram illustrating an example of a logical configuration of the WWAN terminal 200 according to the present embodiment. As illustrated in FIG. 6, the WWAN terminal 200 includes a wireless communication unit 210, a memory unit 220, a subscriber identification module 230, and a control unit 240. Note that the WWAN terminals 200A and 200B may have the same configuration.

(1) Wireless Communication Unit 210

The wireless communication unit 210 is a communication module that transmits and receives data to/from an external device. The wireless communication unit 210 can perform wireless communication using various communication schemes. For example, the wireless communication unit 210 includes a WWAN module 212 and is capable of wireless communication using the WWAN 300. The wireless communication unit 210 also includes a WLAN module 214 and is capable of wireless communication using Wi-Fi, or WLAN. The wireless communication unit 210 also includes a BT module 216 and is capable of wireless communication using Bluetooth. The wireless communication unit 210 also includes an NFC module 218 and is capable of wireless communication using NFC.

For example, by means of the WWAN module 212, the wireless communication unit 210 may serve as a first wireless communication unit that connects to the WWAN 300 to perform wireless communication. For example, the wireless communication unit 210 performs communication with the authentication server 340 via the WWAN module 212.

For example, by means of the WLAN module 214, the wireless communication unit 210 may serve as a second wireless communication unit that performs wireless communication concerning the WLAN 500. For example, the wireless communication unit 210 of the WWAN terminal 200A may perform communication with the base station 510 via the WLAN module 214. In addition, the wireless communication unit 210 of the WWAN terminal 200B may form the WLAN 500 to perform wireless communication with the WLAN terminal 100.

For example, the wireless communication unit 210 can serve as a third wireless communication unit that performs wireless communication with the WLAN terminal 100. For example, the wireless communication unit 210 can perform wireless communication with the WLAN terminal 100 using a near field wireless communication scheme, such as NFC, Bluetooth, Bluetooth low energy, Wi-Fi direct, WLAN, or the like. Besides, the wireless communication unit 210 may perform wireless communication with the WLAN terminal 100 using a near field wireless communication scheme, such as ZigBee, infrared data association (IrDA), or the like.

(2) Memory Unit 220

The memory unit 220 performs recording and reproduction of data on a predetermined recording medium. For example, the memory unit 220 may store a connection destination selection policy, link information for establishing a link with the WLAN terminal 100, and the like.

(3) Subscriber Identification Module 230

The subscriber identification module 230 serves as a storage unit that stores subscriber identification information for the WWAN 300. For example, the subscriber identification module 230 is implemented by a SIM card.

(4) Control Unit 240

The control unit 240 serves as an arithmetic processor and a controller, and controls the overall operation in the WWAN terminal 200 according to various programs. For example, the control unit 240 performs various processes for achieving connection to the WLAN 500 by the WLAN terminal 100. Specifically, the control unit 240 of the WWAN terminal 200B assists connection by the WLAN terminal 100 to the WLAN 500 corresponding to a connection destination selection policy of the WWAN terminal 200A received by the wireless communication unit 210. This allows the WLAN terminal 100 to connect to the WLAN 500. In addition, the control unit 240 of the WWAN terminal 200A controls the wireless communication unit 210 to transmit a connection destination selection policy via the WWAN 300 to the WWAN terminal 200B that assists connection to the WLAN 500 by the WLAN terminal 100. This allows the WWAN terminal 200B to acquire the connection destination selection policy.

A configuration example of the WWAN terminal 200 according to the present embodiment has been described above. Subsequently, technical features of the wireless communication system 1 according to the present embodiment will be described.

3. Technical Features (Request for Assistance)

The WWAN terminal 200A requests assistance for connection to the WLAN 500 by the WLAN terminal 100. Specifically, the WWAN terminal 200A may transmit a connection destination selection policy as a request for assistance. The transmitted connection destination selection policy is received by the WWAN terminal 200B chosen by the wireless communication system 1 via the WWAN 300 and is used for assistance. This connection destination selection policy may be previously shared between the WWAN terminal 200A and the WLAN terminal 100.

The connection destination selection policy can be shared at various timings. For example, the connection destination selection policy may be shared at the timing of transmission from the ANDSF server to the WWAN terminal 200A periodically per hour, per day, per week, or the like, or may be shared at the timing of power on/off of the WWAN terminal 200A, or may be shared at the timing when the WWAN terminal 200A has moved to a certain area.

The connection destination selection policy is information including information concerning a communication scheme of a network, priority of the network, and identification information of the network. A detailed structure of the connection destination selection policy will be described later referring to FIG. 8. As an example, an example in which, regarding ANDSF Management Object having the name of NetworkSelectionPolicy, there are two types of Policy, Set_1 and Set_2, and priority is determined by RulePriority will be described below. Note that Set_1 includes three pieces of access network information, whose priorities are each set by AccessNetworkPriority.

```
./ANDSF/Name=NetworkSelectionPolicy
./ANDSF/Policy/Set_1/RulePriority=1
./ANDSF/Policy/Set_1/PrioritizedAccess/1/AccessTechnology=WLAN
./ANDSF/Policy/Set_1/PrioritizedAccess/1/AccessID=HotSpotSSID1
./ANDSF/Policy/Set_1/PrioritizedAccess/1/AccessNetworkPriority=10
./ANDSF/Policy/Set_1/PrioritizedAccess/2/AccessTechnology=WLAN
./ANDSF/Policy/Set_1/PrioritizedAccess/2/AccessID=HotSpotSSID2
./ANDSF/Policy/Set_1/PrioritizedAccess/2/AccessNetworkPriority=20
./ANDSF/Policy/Set_1/PrioritizedAccess/3/AccessTechnology=WLAN
./ANDSF/Policy/Set_1/PrioritizedAccess/3/AccessID=HotSpotSSID3
./ANDSF/Policy/Set_1/PrioritizedAccess/3/AccessNetworkPriority=30
./ANDSF/Policy/Set_2/RulePriority=2
./ANDSF/Policy/Set_2/PrioritizedAccess/1/AccessTechnology=WLAN
./ANDSF/Policy/Set_2/PrioritizedAccess/1/AccessID=HomeSSID
./ANDSF/Policy/Set_2/PrioritizedAccess/1/AccessNetworkPriority=10
```

(Choice of WWAN Terminal 200B)

Next, choosing the WWAN terminal 200B from among one or more WWAN terminals 200 will be described. For example, the base station 310, the subscriber information server 330, or the network information providing server 350 may serve as an entity that chooses the WWAN terminal 200B.

For example, the wireless communication system 1 chooses, as the WWAN terminal 200B, a WWAN terminal 200 located at a place geographically close to the WLAN terminal 100. Specifically, since the WLAN terminal 100 and the WWAN terminal 200A are often located close to each other, such as by being possessed by the same user, the wireless communication system 1 may choose the WWAN terminal 200B referring to positional information of the WWAN terminal 200A. For that purpose, the WWAN terminal 200A may transmit its own positional information to an entity that chooses the WWAN terminal 200B via the WWAN 300. For transmission of positional information, the WWAN terminal 200A may perform position registration in LTD, for example, or may transmit positional information as a process different from position registration. Positional information may include a cell ID (GERAN_CI, UTRAN_CI, EUTRA_CI), and longitude and latitude information (AnchorLongitude, AnchorLatitude). A detailed structure of positional information will be described later referring to FIG. 9.

The WWAN terminal 200B having been chosen selects whether to form the WLAN 500 for oneself or to cause the WLAN terminal 100 to connect to another WLAN 500. For example, in a case where a WLAN 500 that is connectable or has a communication quality or the like satisfying the standard does not exist in the neighborhood, the WWAN terminal 200B may form the WLAN 500 for oneself. In any way, the WWAN terminal 200B can contribute to connection of the WLAN terminal 100 to the WLAN 500 operated at a position geographically close to the WLAN terminal 100. Note that this selection may be performed by a device other than the WWAN terminal 200B, such as the WLAN terminal 100, the WWAN terminal 200A, the base station 310, or the subscriber information server 330.

Figure 7:
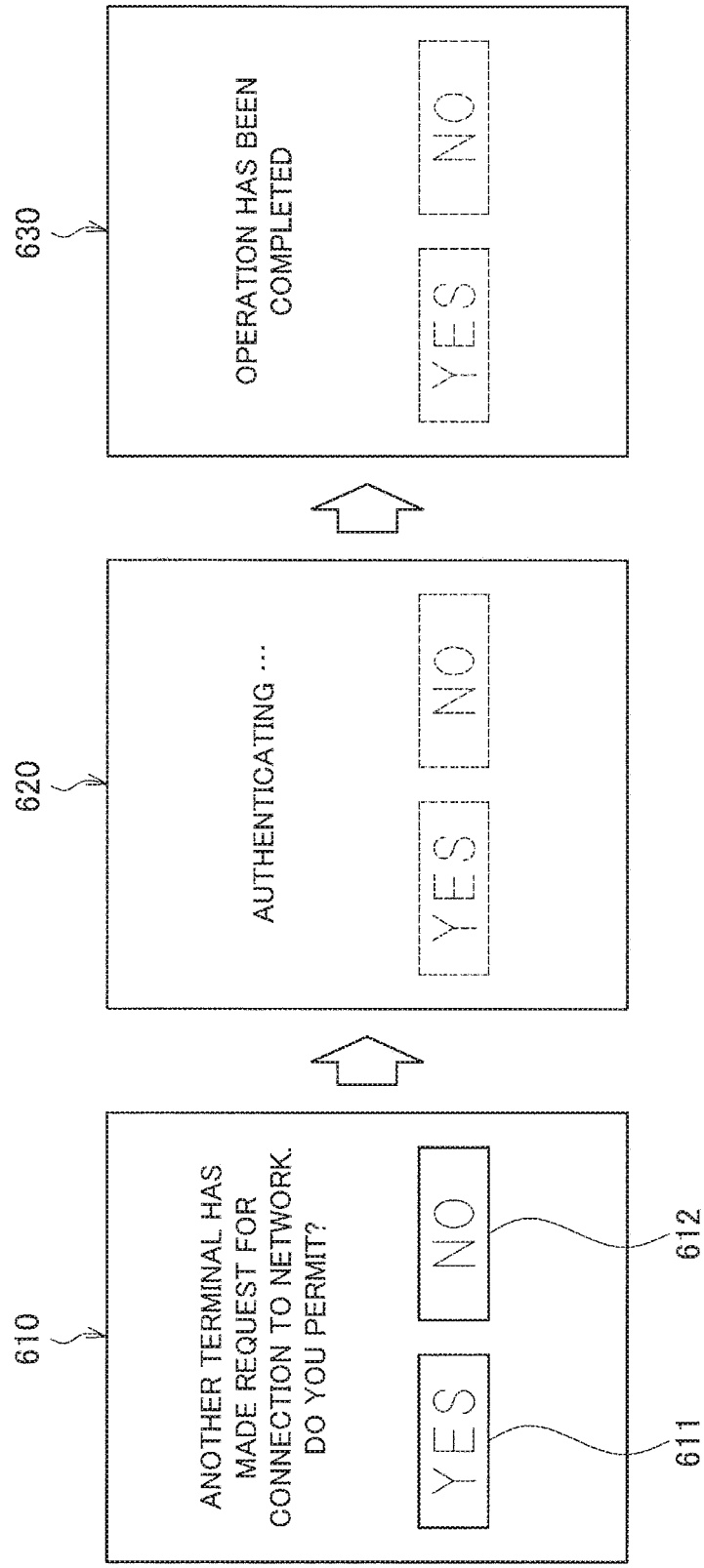
FIG. 7 is a view illustrating an example of a UI in the WWAN terminal according to the present embodiment.

The WWAN terminal 200B may display, to a user of the WWAN terminal 200B, a UI for obtaining permission for assisting the WLAN terminal 100. This is because in a case where the WWAN terminal 200B performs assistance, corresponding power consumption and communication are required. FIG. 7 is a view illustrating an example of a UI in the WWAN terminal 200B according to the present embodiment. As illustrated in FIG. 7, first, a UI indicated by a reference numeral 610 is displayed, and permission (a button 611) or refusal (a button 612) is selected by a user. When the user has permitted, a UI indicated by a reference numeral 620 is displayed, and when authentication is completed, a UI indicated by a reference numeral 630 is displayed. Note that when the user has refused, the wireless communication system 1 may choose a WWAN terminal 200B again. Each UI may include information for identifying the WLAN terminal 100 having requested assistance. For example, a device address of the WLAN terminal 100, an identifier included in link information, or the like may be displayed. Furthermore, the WLAN terminal 100 may notify a user-friendly name when directly communicating with the WWAN terminal 200B. In addition, a telecommunications carrier may provide the WWAN terminal 200B having permitted the request from the WLAN terminal 100 with an incentive, such as a discount on communication charges, and may carry out billing and settlement for the WLAN terminal 100. In that case, the telecommunications carrier may notify the WWAN terminal 200B of information indicating the incentive, and may notify the WLAN terminal 100 of billing and settlement information.

(Connect to Another Network)

The WWAN terminal 200B may select a WLAN 500 that is a connection destination of the WLAN terminal 100 on the basis of a received connection destination selection policy. For example, the WWAN terminal 200B may select a WLAN 500 with a high-priority SSID. Moreover, the WWAN terminal 200 may select a connection destination of the WLAN terminal 100 further on the basis of its own connection destination selection policy. For example, the WWAN terminal 200 may select a WLAN 500 with a SSID having a high priority in common in the both connection destination selection policies. In this manner, the WLAN terminal 100 can connect to an appropriate WLAN 500 by means of a selection based on a connection destination selection policy.

(Network Formation by WWAN Terminal 200B)

For example, in a case where a connection destination selection policy is received, the WWAN terminal 200B may control the WLAN module 214 to form the WLAN 500. Specifically, the WWAN terminal 200B may form the WLAN 500 as an access point of a wireless LAN or as a P2P Group Owner of Wi-Fi Direct (registered trademark). In a case where the WLAN terminal 100 has connected to this WLAN 500, the WLAN terminal 100 can access the Internet via the WWAN terminal 200B.

The WWAN terminal 200B may form the WLAN 500 using high-priority identification information included in the connection destination selection policy. For example, the WWAN terminal 200B activates the WLAN 500 using a high-priority SSID. This allows the WLAN terminal 100 to attempt to connect with priority to the WLAN 500 formed by the WWAN terminal 200B even if a connectable WLAN 500 exists in the neighborhood.

The WWAN terminal 200B may relay communication between the WLAN terminal 100 and the WWAN 300. For example, by means of the WWAN module 212 and the WLAN module 214, the WWAN terminal 200B serves as a relay station that relays communication performed by the WLAN terminal 100 connected to the WLAN 500 formed by the WWAN terminal 200B.

(Establishment of Link)

The WLAN terminal 100 may establish a link (pairing) with the WWAN terminal 200 to perform wireless communication. This allows the WLAN terminal 100 and the WWAN terminal 200 to directly transmit and receive a variety of information.

The WWAN terminal 200 specifies the WLAN terminal 100 using link information, and forms a link. The link information may include, for example, identification information for identifying the WLAN terminal 100. For example, in a case where a link is formed using Bluetooth, the link information of the WLAN terminal 100 may include Bluetooth Device Address of the WLAN terminal 100. For example, the WWAN terminal 200A may acquire link information directly from the WLAN terminal 100. On the other hand, the WWAN terminal 200B may receive link information via the WWAN 300. For the WWAN terminal 200B, direct communication is not preferable from the viewpoint of security since the WLAN terminal 100 is a terminal used by another user. In this respect, the WWAN terminal 200B can ensure security by using link information once passed through the WWAN 300 (the subscriber information server 330).

The WWAN terminal 200A may transmit link information of the WLAN terminal 100 to the WWAN terminal 200B via the WWAN 300. In particular, the WWAN terminal 200A may transmit link information in the case where the WLAN 500 exists in the neighborhood. As will be described later, in the case where the WLAN 500 exists in the neighborhood, the WWAN terminal 200B may be involved in an authentication process to the WLAN 500 existing in the neighborhood by the WLAN terminal 100. Therefore, with the WWAN terminal 200A transmitting link information in the case where the WLAN 500 exists in the neighborhood, the WWAN terminal 200B can establish a link with the WLAN terminal 100 to transmit and receive information for the authentication process.

(EAP Authentication)

The WWAN terminal 200 may be involved in the authentication process to the WLAN 500 by the WLAN terminal 100.

For example, the WLAN terminal 100 may perform authentication to the WLAN 500 by the authentication process through use of subscriber identification information. At that time, the WLAN terminal 100 may perform authentication to the WLAN 500 by EAP authentication through use of subscriber identification information that the WWAN terminal 200 has.

For example, the WLAN terminal 100 relays a message exchanged between the WWAN terminal 200 and the WLAN 500 for the authentication process performed by the WWAN terminal 200. Specifically, the WLAN terminal 100 first transmits, to the WWAN terminal 200, a message that requests generation of authentication information based on subscriber identification information. On the basis of the received message, the WWAN terminal 200, using its own subscriber identification information, generates authentication information for EAP authentication to the WLAN 500 by the WLAN terminal 100, and returns a message including the generated authentication information to the WLAN terminal 100. Then, the WLAN terminal 100 transmits the received message to the base station 510 that operates the WLAN 500 that is a connection destination of the WLAN terminal 100.

Through the above-described relay process of messages, the WLAN terminal 100 can cause the WWAN terminal 200 to, as a proxy, perform an authentication process to the WLAN 500 using EAP. Therefore, the WLAN terminal 100 can connect to the WLAN 500 easily even without subscriber identification information.

By receiving a message relayed by the WLAN terminal 100, the WWAN terminal 200 can, as a proxy for the WLAN terminal 100, perform an authentication process to the WLAN 500 using EAP. Therefore, even when the WLAN terminal 100 does not have subscriber identification information, the WWAN terminal 200 allows the WLAN terminal 100 to connect to the WLAN 500 easily. Moreover, the WWAN terminal 200 does not transmit subscriber identification information or the like directly to the WLAN terminal 100, which ensures security.

For the authentication process, any authentication protocol may be employed in which subscriber information is used, such as EAP-AKA, EAP-SIM, or EAP-AKA'. A message exchanged between the WLAN terminal 100 and the WWAN terminal 200 may be, for example, EAP-Request/Identity and EAP-Response/Identity. Besides, the above-described message may be EAP-Request/AKA-Challenge and EAP-Response/AKA-Challenge. Note that an example in which EAP-AKA is employed will be described below as an example of the authentication protocol through use of subscriber identification information, whilst another authentication protocol may be employed in which subscriber information is used for the authentication process, such as EAP-SIM or EAP-AKA'.

(Example of Connection Destination Selection Policy)

Subsequently, the details of a connection destination selection policy will be described referring to FIG. 8.

Figure 8:
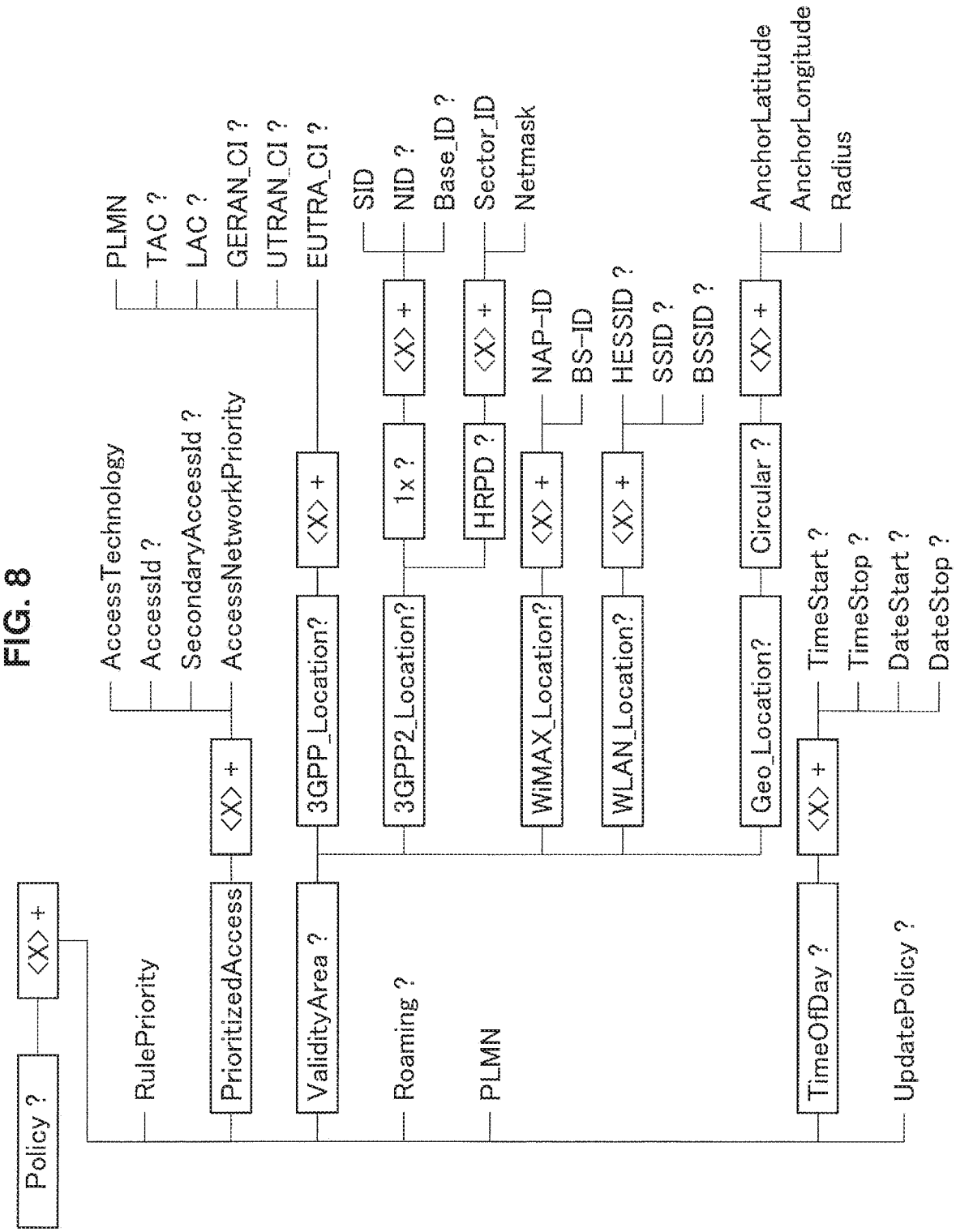
FIG. 8 is an explanatory diagram for explaining an example of a connection destination selection policy according to the present embodiment.

FIG. 8 is an explanatory diagram for explaining an example of a connection destination selection policy according to the present embodiment. FIG. 8 illustrates a configuration of nodes included in a connection destination selection policy. As illustrated in FIG. 8, the connection destination selection policy has a directory structure. Each node will be described below.

<X>:

A place holder for a certain node

RulePriority:

Priority of rules. Expressed by an integer, and priority is higher as the value is smaller.

PrioritizedAccess:

A node indicating prioritized access for a certain rule

AccessTechnology:

Denotes a technology for prioritized connection by any of the following integers 0: Reserved

1: 3GPP

2: Reserved

3: WLAN

4: WiMAX 5-255: Reserved

AccessId:

As an access network ID, denotes, by a character string, SSID in the case of WLAN and NAP-ID in the case of WiMAX SecondaryAccessId:

Denotes only HESSID by a character string for a WLAN access network. Used only when WLAN is selected for AccessId.

AccessNetworkPriority:

Denotes priority of access technology by an integer of 1 to 250. Priority is higher as the value is smaller.

0: Reserved
1-250: Priority value
251-253: Reserved
254: Limited access. Access should not be made when the current rule is valid.
255: Prohibited. UE should not make access when the current rule is valid.
ValidityArea:
　A location condition for a certain rule
3GPP_Location:
　A 3GPP location
PLMN:
　A public land mobile network (PLMN) code for a certain 3GPP location condition
TAC:
　A tracking area code for a certain 3GPP location condition
LAC:
　A location area code for a certain 3GPP location condition
GERAN_CI:
　A cell ID of a place related to a certain GSM EDGE radio access network (GERAN) network
UTRAN_CI:
　A cell ID of a place related to a certain UMTS terrestrial radio access network (UTRAN) network
EUTRA_CI:
　A cell ID of a place related to a certain evolved universal terrestrial radio access (E-UTRA) network
3GPP2_Location:
　A 3GPP2 location
1x:
　A 3GPP2 1x radio access technology (RAT) location
SID:
　A system identification code for a 3GPP2 1x RAT location condition NID:
　A network identification code for a 3GPP2 1x RAT location condition
Base_ID:
　A base station identification code for a 3GPP2 1x RAT location condition
HRPD:
　A 3GPP2 HRPD RAT location
Sector_ID:
　A sector ID for a 3GPP2 HRPD RAT location condition
Netmask:
　A net mask code for a 3GPP2 HRPD RAT location condition
WiMAX_Location:
　A WiMAX location
NAP-ID:
　A Network Access Provider ID for a certain WiMAX location condition
BS-ID:
　A base station ID for a certain WiMAX location condition
WLAN_Location:
　A WLAN location
HESSID:
　HESSID for a certain WLAN location condition
SSID:
　SSID for a certain WLAN location condition
BSSID:
　BSSID for a certain WLAN location condition
Geo_Location:
　A GPS location
Circular:
　A circular area location
AnchorLatitude:
　A latitude of the center of a circular area
AnchorLongitude:
　A longitude of the center of a circular area
Radius:
　An effective radius of a circular area
TimeOfDay:
　A node indicating circumstances of date and time
Time Start:
　A start time
TimeStop:
　A stop time
DateStart:
　A date of start
DateStop:
　A date of stop
UpdatePolicy:
　Indicates update policy by 0 or 1
　0: unnecessary to update UE
　1: necessary to update UE
(Example of Positional Information)

Subsequently, the details of positional information will be described referring to FIG. 9.

Figure 9:
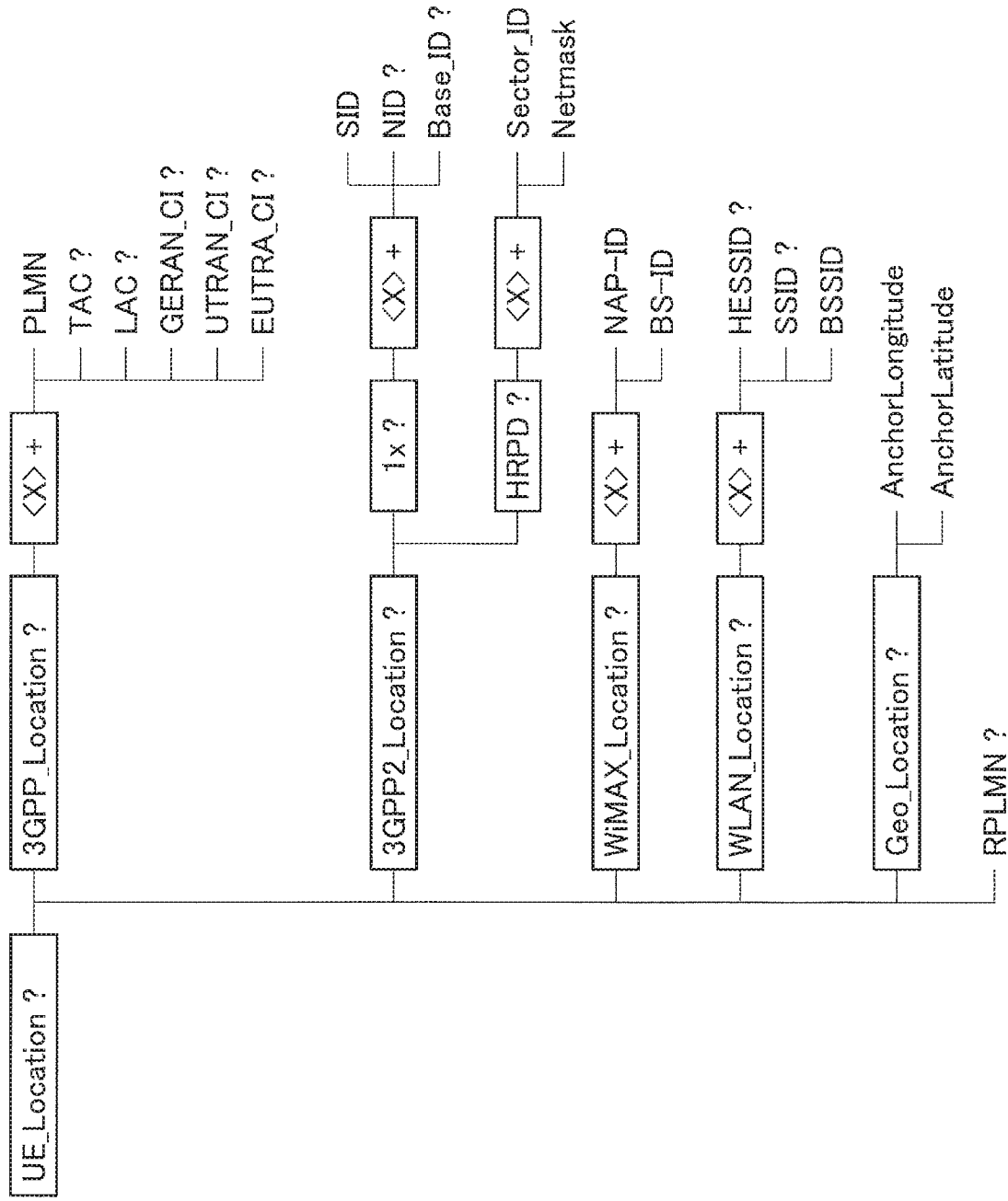
FIG. 9 is an explanatory diagram for explaining an example of positional information according to the present embodiment.

FIG. 9 is an explanatory diagram for explaining an example of positional information according to the present embodiment. FIG. 9 illustrates a configuration of nodes included in positional information. As illustrated in FIG. 9, positional information has a similar structure to a part of the connection destination selection policy described above referring to FIG. 8, and thus repeated explanation is omitted here.

4. Example of Operation And Process (Connection Process 1)

Figure 10:
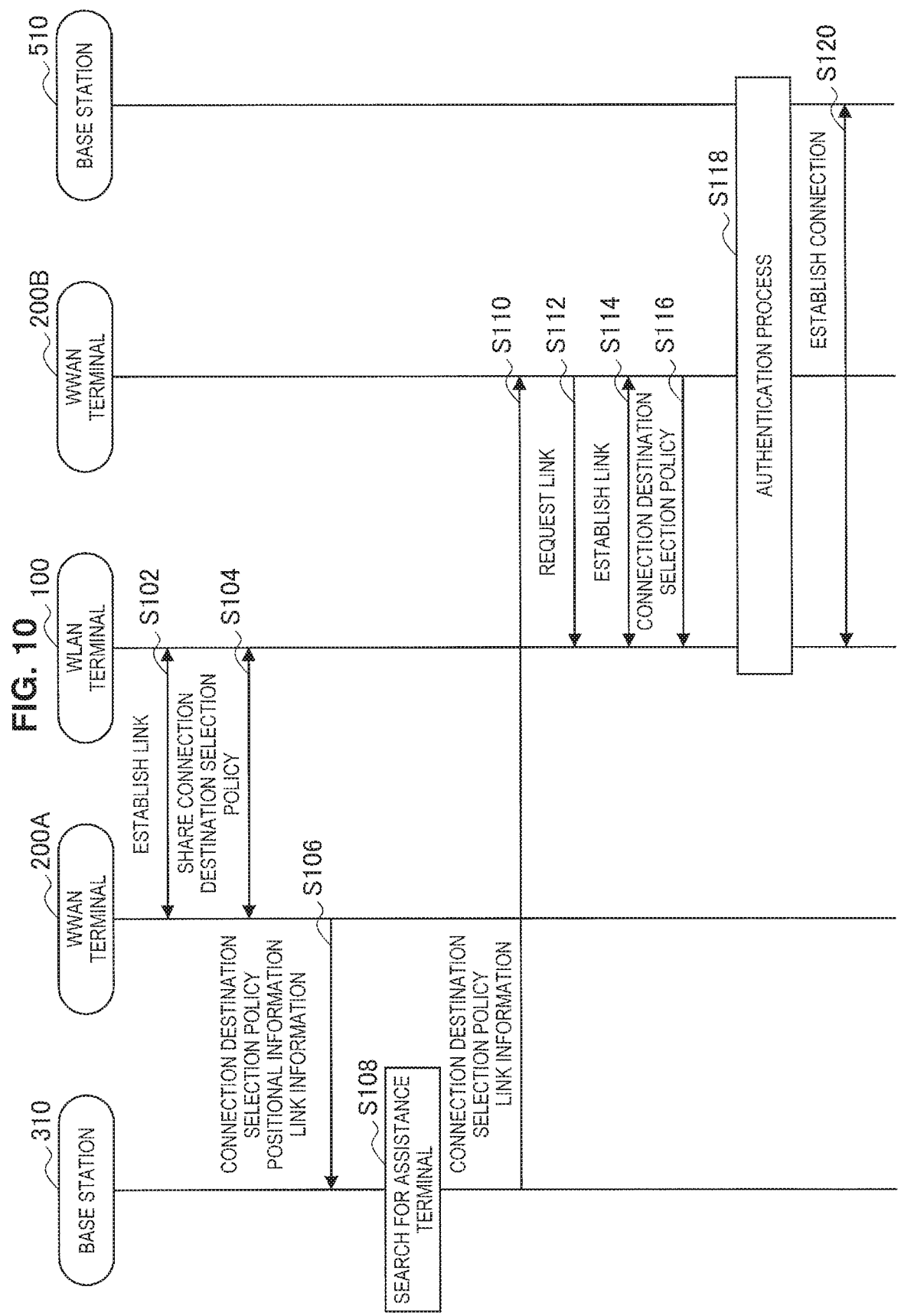
FIG. 10 is a sequence diagram illustrating an example of the flow of a connection process executed in a wireless communication system according to the present embodiment.

FIG. 10 is a sequence diagram illustrating an example of the flow of a connection process executed in the wireless communication system 1 according to the present embodiment. As illustrated in FIG. 10, the sequence involves the base station 310, the WWAN terminal 200A, the WLAN terminal 100, the WWAN terminal 200B, and the base station 510. The present sequence corresponds to FIG. 1 and FIG. 3.

As illustrated in FIG. 10, first, in step S102, the WWAN terminal 200A and the WLAN terminal 100 establish a link. For example, through use of link information previously received from the WLAN terminal 100, the WWAN terminal 200A establishes a link using any communication scheme, such as Bluetooth, NFC, or Wi-Fi Direct.

Then, in step S104, the WWAN terminal 200A and the WLAN terminal 100 share a connection destination selection policy. For example, the WWAN terminal 200A transmits its own connection destination selection policy to the WLAN terminal 100.

Next, in step S106, the WWAN terminal 200A transmits the connection destination selection policy, positional information, and link information to the base station 310.

Then, in step S108, the base station 310 searches for an assistance terminal. For example, the base station 310 chooses, as an assistance terminal, the WWAN terminal 200B located at a place geographically close to the WWAN terminal 200A indicated by the positional information received in the above-described step S106.

Next, in step S110, the base station 310 transmits the connection destination selection policy and link information received in the above-described step S106 to the WWAN terminal 200B having been chosen. In addition to these pieces of information, the base station 310 may transmit the authentication type, such as EAP-AKA or EAP-TLS, and information for authentication, such as a certificate. Transmission may be performed to one or more terminals. In the case of a plurality of terminals, one WWAN terminal 200 among them will operate as the WWAN terminal 200B. The other WWAN terminals 200 may automatically stop a process for assistance after the lapse of a predetermined time, for example. Moreover, the WWAN terminal 200B having received these pieces of information may display, to a user of the WWAN terminal 200B, a UI for obtaining permission regarding assisting the WLAN terminal 100, an example of which is illustrated in FIG. 7.

Then, in step S112, the WWAN terminal 200B transmits a link request to the WLAN terminal 100 using the link information received in the above-described step S110. For example, in the case where Bluetooth is used, the WWAN terminal 200B transmits a link request to a terminal of a Bluetooth Device Address included in the link information.

Next, in step S114, the WWAN terminal 200B and the WLAN terminal 100 build a link. For example, in the case where Bluetooth is used, the WWAN terminal 200 and the WLAN terminal 100 establish pairing, resulting in a state where communication can be performed using Bluetooth.

Then, in step S116, the WWAN terminal 200B transmits the connection destination selection policy to the WLAN terminal 100. Here, in the case where the authentication process through use of the subscriber identification information of the WWAN terminal 200B is performed in later step S118, it is desirable that the connection destination selection policy of the WWAN terminal 200B be used in the present step. For example, the WWAN terminal 200B selects a WLAN 500 to which the WLAN terminal 100 should connect on the basis of both the connection destination selection policy received in the above-described step S110 and its own connection destination selection policy. Specifically, the WWAN terminal 200B may selectively transmit the connection destination selection policy of a WLAN 500 under preferable condition on the basis of priority in the both connection destination selection policies, RSSI, communication speed, and the like.

Then, in step S118, the WLAN terminal 100 performs an authentication process to the WLAN 500 using the subscriber identification information of the WWAN terminal 200. In the present sequence, it is assumed that the subscriber identification information of the WWAN terminal 200B is used. In the present step, a message for an EAP authentication process is transmitted and received using a communication path established in the above-described step S114. A detailed process in the present step will be described later referring to FIG. 11 and FIG. 12.

Connection is thus established between the WLAN terminal 100 and the base station 510 in step S120. The WLAN terminal 100 utilizes the service network 400 via the base station 510. Services that may be utilized can include an IMS service, such as Voice over Wi-Fi or Video over Wi-Fi, for example.

(EAP Authentication Process)

Figure 11:
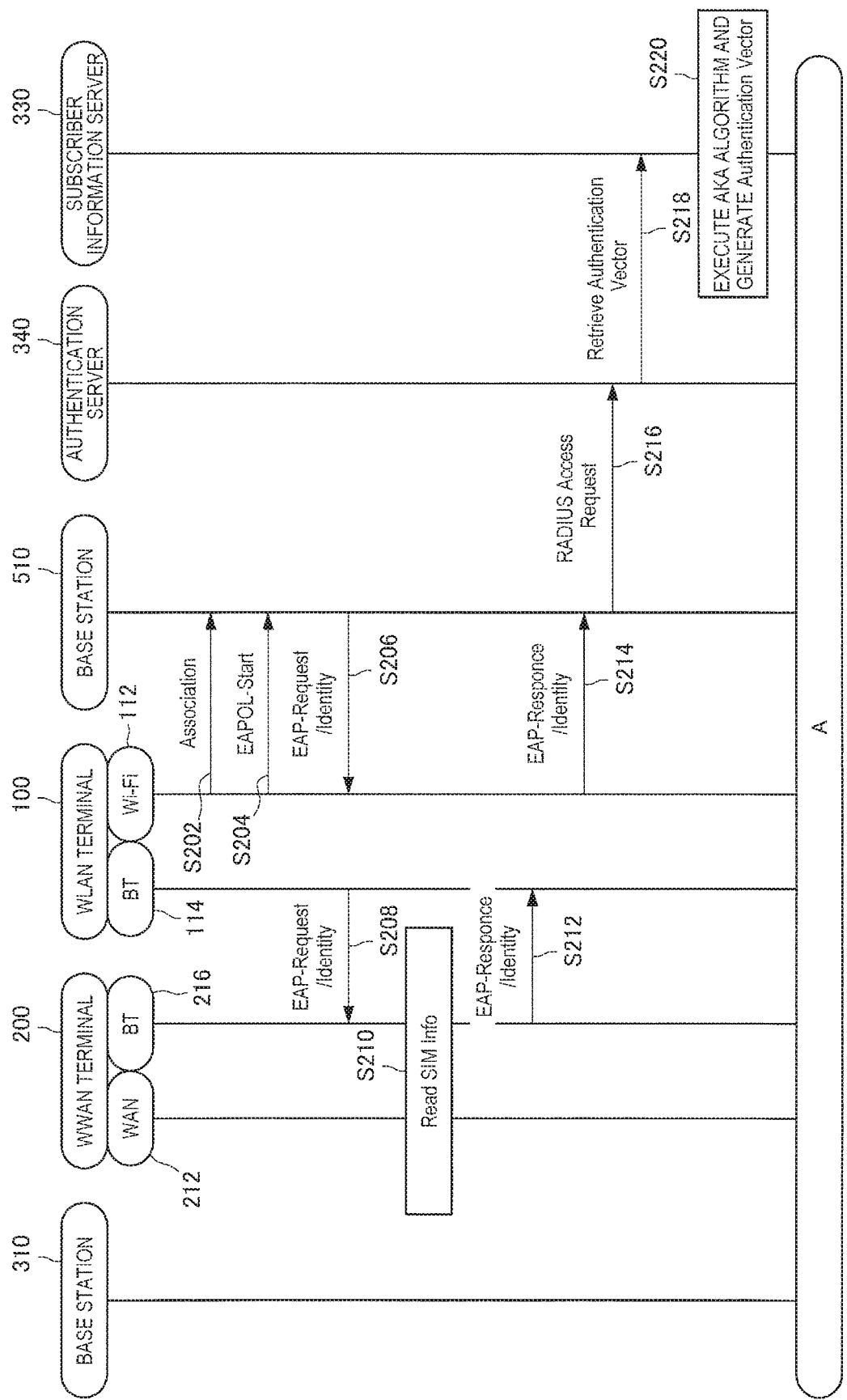
FIG. 11 is a sequence diagram illustrating an example of the flow of an EAP authentication process executed in the wireless communication system according to the present embodiment.
Figure 12:
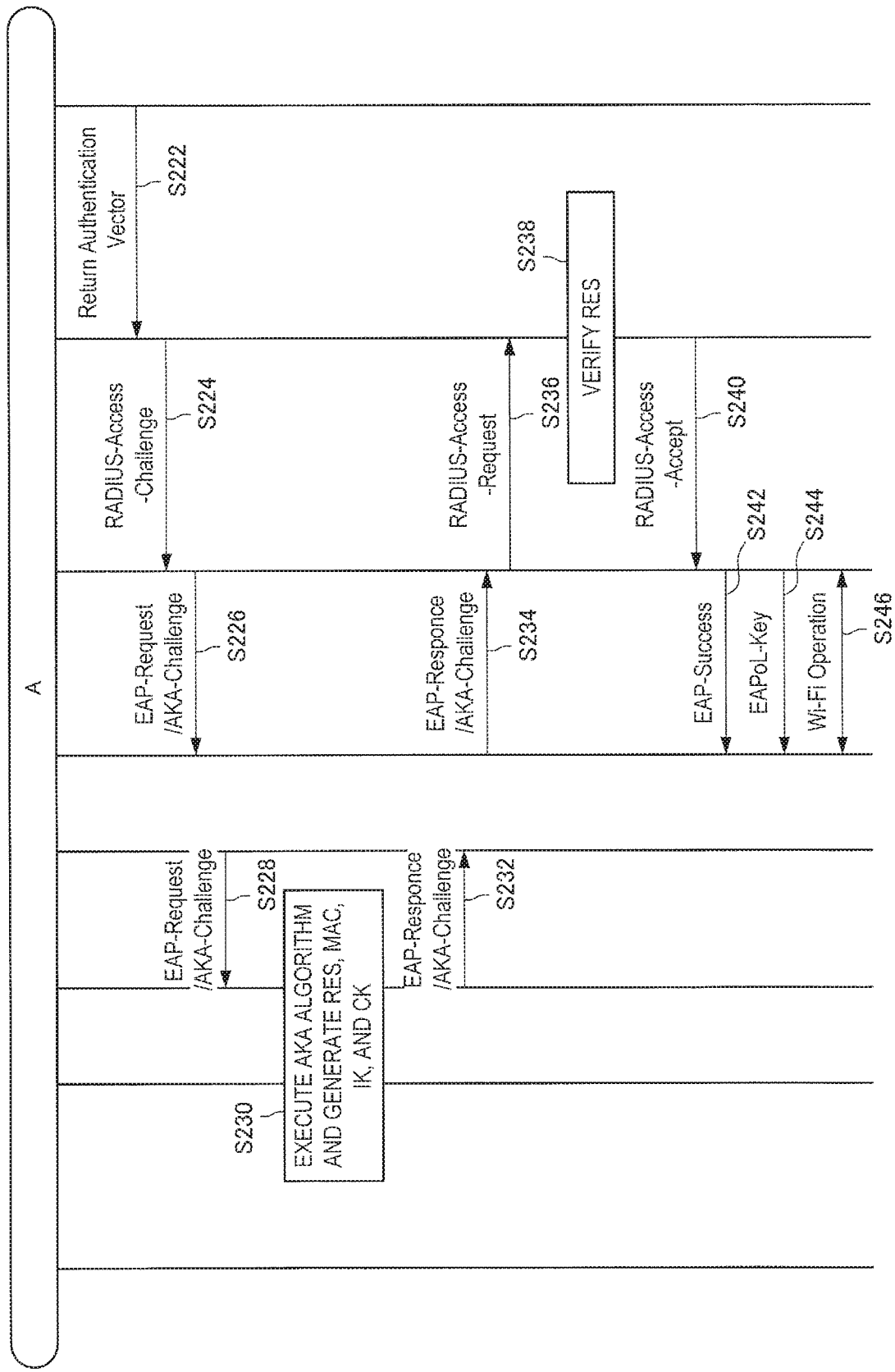
FIG. 12 is a sequence diagram illustrating an example of the flow of an EAP authentication process executed in the wireless communication system according to the present embodiment.

Hereinafter, the details of an EAP authentication process using subscriber identification information of the WWAN terminal 200 will be described referring to FIG. 11 and FIG. 12. Note that the WWAN terminal 200 appearing in FIG. 11 and FIG. 12 is a terminal having subscriber identification information used for authentication to the WLAN 500 by the WLAN terminal 100. That is, in a case where subscriber identification information of the WWAN terminal 200A is used, the "WWAN terminal 200" in the following description may be replaced by the "WWAN terminal 200A." Moreover, in a case where subscriber identification information of the WWAN terminal 200B is used, the "WWAN terminal 200" in the following description may be replaced by the "WWAN terminal 200B."

FIG. 11 and FIG. 12 are sequence diagrams illustrating an example of the flow of an EAP authentication process executed in the wireless communication system 1 according to the present embodiment. As illustrated in FIG. 11 and FIG. 12, the sequence involves the base station 310, the WWAN terminal 200, the WLAN terminal 100, the base station 510, the authentication server 340, and the subscriber information server 330. Regarding the WLAN terminal 100 and the WWAN terminal 200, communication modules used in message exchange are mentioned without the word "module." For example, messages having the WLAN (Wi-Fi) module 112 as a starting point or an end point indicate that the messages are transmitted or received by the WLAN module 112. This is the same for the BT module 114, the WWAN module 212, and the BT module 216.

Here, as described above, the communication path has been established between the WLAN terminal 100 and the WWAN terminal 200, and messages for the EAP authentication process are transmitted and received using the communication path. As an example, in the present sequence, it is assumed that wireless connection using Bluetooth has been established between the WLAN terminal 100 and the WWAN terminal 200. Needless to say, the wireless connection may be established according to an arbitrary communication scheme other than Bluetooth, for example, Wi-Fi direct or the like.

As illustrated in FIG. 11, first, in step S202, the WLAN terminal 100 performs association with the base station 510. By the association, the WLAN terminal 100 establishes logical connection for an authentication process. The WLAN terminal 100 cannot yet perform operation other than an authentication process, such as data communication.

Then, in step S204, the WLAN terminal 100 transmits EAPoL-Start to the base station 510.

Further, in step S206, the base station 510 transmits EAP-Request/Identity to the WLAN terminal 100.

Next, in step S208, the WLAN terminal 100 transmits EAP-Request/Identity received in step S206 to the WWAN terminal 200. This message requests the WWAN terminal 200 to generate Identity needed in EAP-AKA.

Then, in step S210, the WWAN terminal 200 generates Identity referring to its own subscriber identification module 230. For example, the control unit 240 generates Identity on the basis of information recorded on a SIM card serving as the subscriber identification module 230. In the case where the authentication protocol is EAP-AKA, Identity is generated on the basis of IMSI.

IMSI has the following format.

<MCC: 3 digits><MNC: 2 or 3 digits><MSIN: 10 digits at maximum>

Here, Mobile Country Code (MCC) is information indicating a country, Mobile Network Code (MNC) is information indicating a carrier, and Mobile Subscriber Identification Number (MSIN) is information indicating a subscriber identification code.

Identity has the following format.

0<IMSI>@wlan.mnc<MNC>.
mcc<MCC>.3gppnetwork.org

For example, assuming that MNC has three digits and IMSI is "123456012345678", Identity is "0123456012345678@wlan.mnc456.mcc123.3 gppnetwork.org". Description has been given on the Identity generation process in step S210.

Next, in step S212, the WWAN terminal 200 returns EAP-Response/Identity to the WLAN terminal 100. This message stores Identity generated in step S210.

Then, in step S214, the WLAN terminal 100 transfers the received EAP-Response/Identity to the base station 510.

Next, in step S216, the base station 510 transmits RADIUS-Access-Request to the authentication server 340. This message stores Identity generated by the WWAN terminal 200.

Then, in step S218, the authentication server 340 transmits Retrieve-Authentication-Vector to the subscriber information server 330, to request an authentication vector for Identity. This message stores Identity generated by the WWAN terminal 200. An authentication vector is a set of information needed in authenticating a terminal that has connected, and includes the following information in EAP-AKA.

RAND: A random value. Used as a challenge.
AUTN: A value for a terminal to authenticate a network.
XRES: A response value expected in response to a challenge.
IK: Message integrity verification key.
CK: Message encryption key.

Next, in step S220, the subscriber information server 330 executes AKA algorithm to generate an authentication vector corresponding to Identity stored in the received message.

Then, as illustrated in FIG. 12, in step S222, the subscriber information server 330 transmits the generated authentication vector to the authentication server 340.

Next, in step S224, the authentication server 340 transmits RADIUS-Access-Challenge to the base station 510. This message stores the authentication vector generated by the subscriber information server 330. Here, the authentication server 340 newly calculates Message Authentication Code (MAC), and adds it to the message. This MAC is used for the WLAN terminal 100 to verify the integrity of the message.

Then, in step S226, the base station 510 transmits EAP-Request/AKA-Challenge to the WLAN terminal 100. This message includes RAND and AUTN of the authentication vector, and MAC. XRES, IK, and CK of the authentication vector are retained by the base station 510, not being transmitted to the WLAN terminal 100.

Next, in step S228, the WLAN terminal 100 transmits EAP-Request/AKA-Challenge to the WWAN terminal 200. This message requests the WWAN terminal 200 to generate a response value (RES) and session keys (IK, CK).

Then, in step S230, the WWAN terminal 200 executes AKA algorithm to generate RES, MAC, and session keys (IK, CK) corresponding to the received EAP-Request/AKA-Challenge.

Next, in step S232, the WWAN terminal 200 transmits EAP-Response/AKA-Challenge to the WLAN terminal 100. This message stores RES, MAC, and the session keys generated by the WWAN terminal 200.

Then, in step S234, the WLAN terminal 100 transfers the received EAP-Response/AKA-Challenge to the base station 510.

Next, in step S236, the base station 510 transmits RADIUS-Access-Request to the authentication server 340. This message stores RES, MAC, and the session keys (IK, CK) generated by the WWAN terminal 200.

Then, in step S238, the authentication server 340 verifies the received RES. Specifically, the authentication server 340 verifies the integrity of the message on the basis of the coincidence between RES generated by the WWAN terminal 200 and XRES generated by the subscriber information server 330, and MAC.

Next, in step S240, the authentication server 340 transmits RADIUS-Access-Accept to the base station 510. This message indicates permission for connection.

Then, in step S242, the base station 510 transmits EAP-Success to the WLAN terminal 100. This message reports to the WLAN terminal 100 that the authentication process has succeeded.

Next, in step S244, the base station 510 transmits EAPoL-Key to the WLAN terminal 100. This message sends a key for encrypted communication to be used between the WLAN terminal 100 and the base station 510.

Through the above-described EAP authentication process, connection for WLAN communication is completed between the WLAN terminal 100 and the base station 510 in step S246. Thus, data communication using Wi-Fi, for example, is started between the WLAN terminal 100 and the base station 510.

(Connection Process 2)

Figure 13:
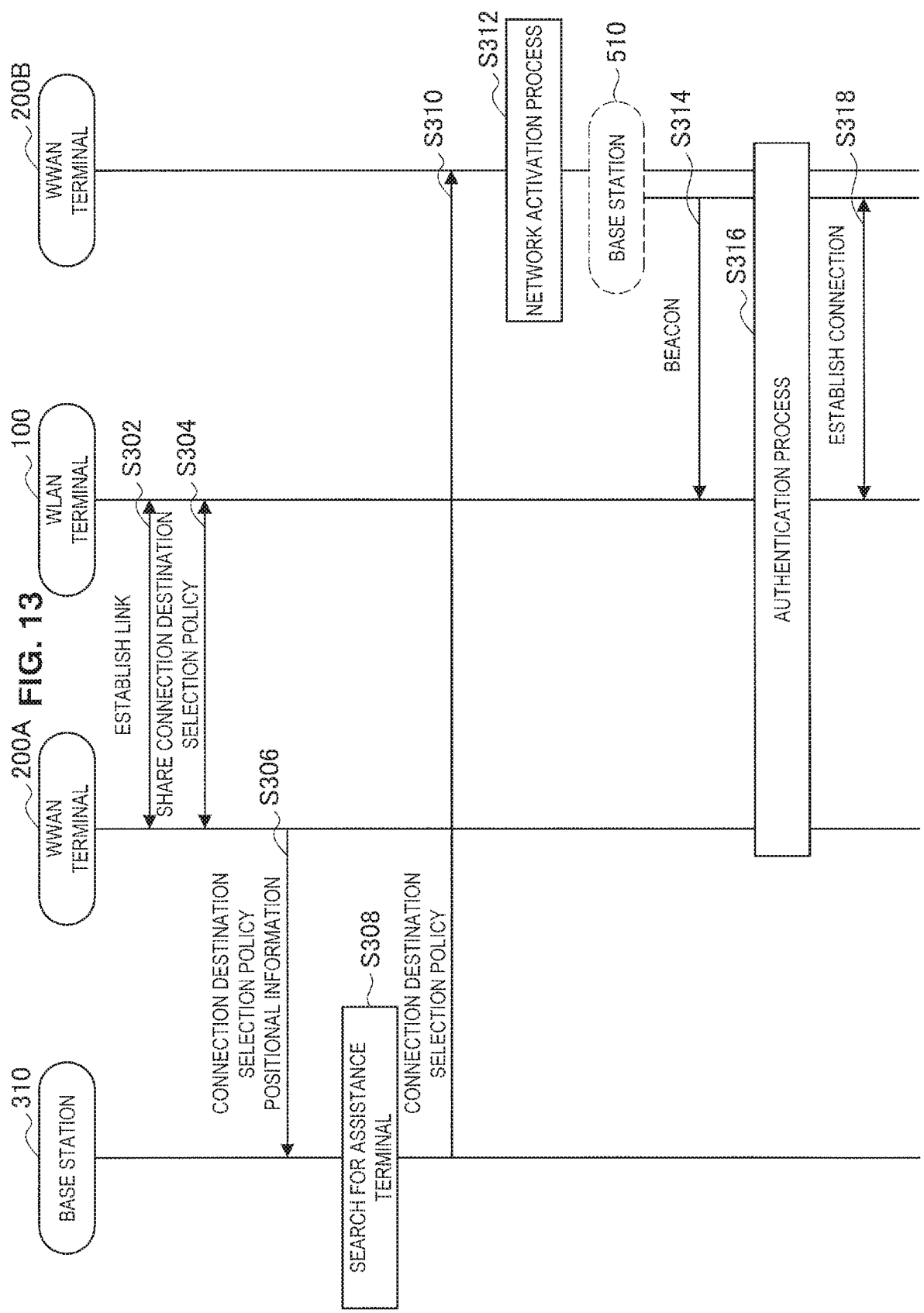
FIG. 13 is a sequence diagram illustrating an example of the flow of a connection process executed in a wireless communication system according to the present embodiment.

FIG. 13 is a sequence diagram illustrating an example of the flow of a connection process executed in the wireless communication system 1 according to the present embodiment. As illustrated in FIG. 13, the present sequence involves the base station 310, the WWAN terminal 200A, the WLAN terminal 100, and the WWAN terminal 200B. The present sequence corresponds to FIG. 2 and FIG. 4.

As illustrated in FIG. 13, in steps S302 to S310, a process similar to steps S102 to S110 illustrated in FIG. 10 is performed. However, link information may be omitted from information transmitted from the WWAN terminal 200A to the WWAN terminal 200B via the base station 310.

Then, in step S312, the WWAN terminal 200B performs a network activation process. Here, in the case where an authentication process through use of subscriber identification information of the WWAN terminal 200A is performed in later step S316, it is desirable that a connection destination selection policy of the WWAN terminal 200A be used in the present step. For example, on the basis of the connection destination selection policy and information for authentication received in the above-described step S310, the WWAN terminal 200B activates the function as the base station 510 to form the WLAN 500. The WWAN terminal 200B may activate the function as the base station 510 while maintaining the WWAN communication function and the WLAN communication function, or may be restarted as an access-point-dedicated terminal.

Next, in step S314, the base station 510 (namely, the WWAN terminal 200B serving as the base station 510) transmits a beacon to the surroundings. FIG. 13 illustrates the manner in which the WLAN terminal 100 has received the beacon transmitted from the base station 510 as a beacon relevant to the connection destination selection policy shared in the above-described step S304. The WLAN terminal 100 may identify whether the beacon is relevant to the connection destination selection policy in accordance with SSID.

Then, in step S316, the WLAN terminal 100 performs an authentication process to the WLAN 500 using the subscriber identification information of the WWAN terminal 200. In the present sequence, it is assumed that subscriber identification information of the WWAN terminal 200A is used. In the present step, a message for an EAP authentication process is transmitted and received using the communication path established in the above-described step S302. The detailed process in the present step has been described above referring to FIG. 11 and FIG. 12.

Thus, connection between the WLAN terminal 100 and the base station 510 is established in step S318.

5. Application Examples

The technology of the present disclosure can be applied to various products. For example, the wireless communication apparatuses 100 and 200 may be implemented as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation apparatus. In addition, the wireless communication apparatuses 100 and 200 may be implemented as a terminal which performs machine-to-machine (M2M) communication (which is also referred to as a machine-type communication (MTC) terminal) such as a smart meter, a vending machine, a remote monitoring apparatus, or a point-of-sale (POS) terminal. Furthermore, the wireless communication apparatuses 100 and 200 may be a wireless communication module (for example, an integrated circuit module configured in one die) mounted in these terminals.

5.1. First Application Example

Figure 14:
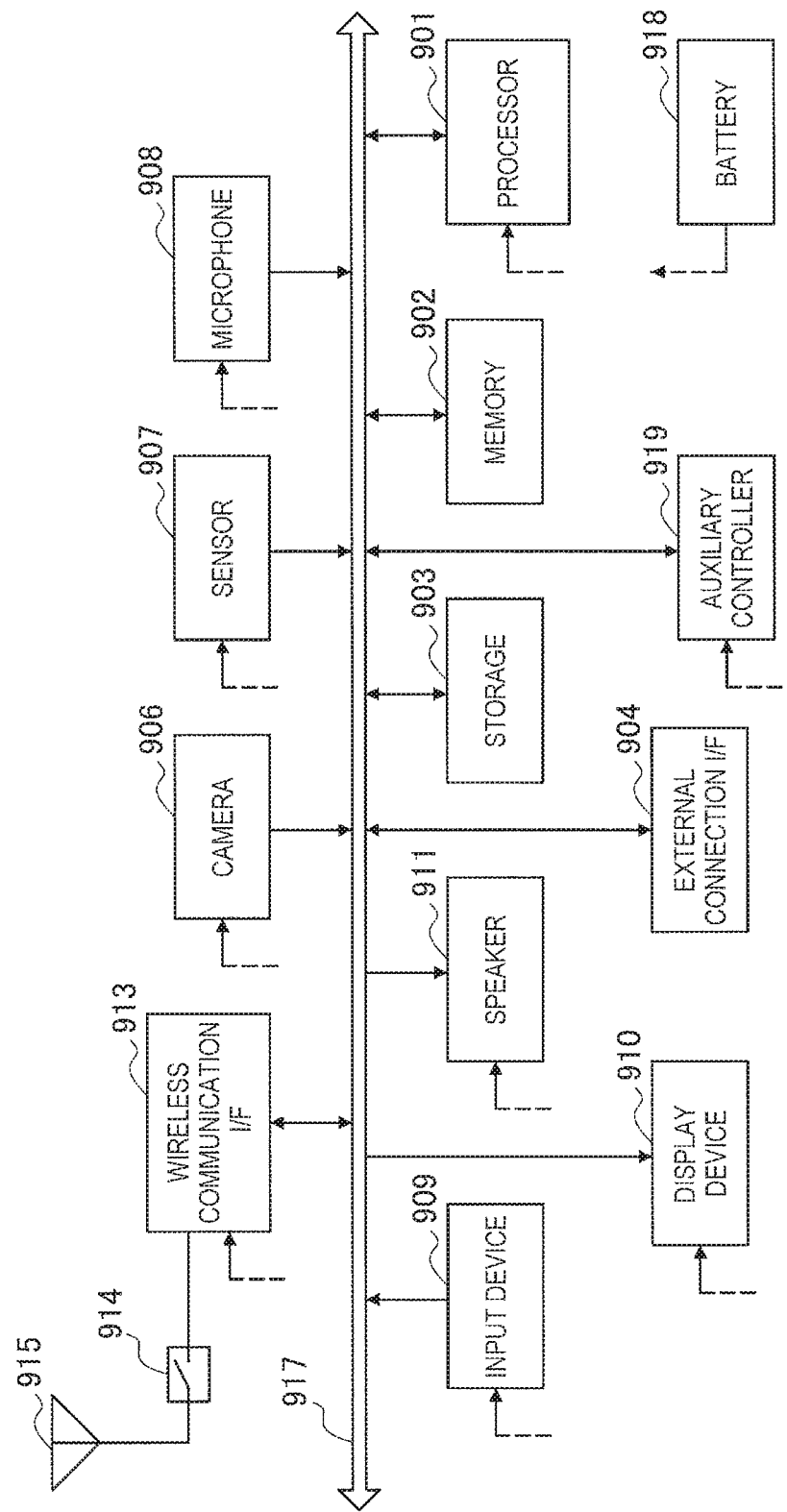
FIG. 14 is a block diagram illustrating an example of a schematic configuration of a smartphone.

FIG. 14 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) or an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another apparatus via a wireless LAN access point in an infrastructure mode. In addition, the wireless communication interface 913 can directly communicate with another apparatus in an ad hoc mode or a direct communication mode such as Wi-Fi direct (registered trademark), or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

It should be noted that the smartphone 900 is not limited to the example of FIG. 14 and may include a plurality of antennas (for example, an antenna for a wireless LAN, or an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 illustrated in FIG. 14, one or more structural elements (for example, at least either the memory unit 120 or the control unit 130) included in the WLAN terminal 100 described using FIG. 5 may be incorporated into the wireless communication interface 913. Moreover, at least some of these structural elements may be incorporated into the processor 901 or the auxiliary controller 919. As an example, a module including the wireless communication interface 913, the processor 901, and/or the auxiliary controller 919 may be mounted in the smartphone 900, and the above-described one or more structural elements may be incorporated into this module. In this case, the above-described module may store a program for causing the processor to function as the above-described one or more structural elements (in other words, a program for causing the processor to execute operations of the above-described one or more structural elements), and may execute the program. As another example, a program for causing the processor to function as the above-described one or more structural elements may be installed in the smartphone 900, and the wireless communication interface 913, the processor 901, and/or the auxiliary controller 919 may execute the program. As described above, the smartphone 900 or the above-described module may be provided as a device including the above-described one or more structural elements, and a program for causing the processor to function as the above-described one or more structural elements may be provided. Alternatively, a readable recording medium that stores the above-described program may be provided.

In the smartphone 900 illustrated in FIG. 14, one or more structural elements (for example, at least either the memory unit 220, the subscriber identification module 230, or the control unit 240) included in the WWAN terminal 200 described using FIG. 6 may be incorporated into the wireless communication interface 913. Moreover, at least some of these structural elements may be incorporated into the processor 901 or the auxiliary controller 919. As an example, a module including the wireless communication interface 913, the processor 901, and/or the auxiliary controller 919 may be mounted in the smartphone 900, and the above-described one or more structural elements may be incorporated into this module. In this case, the above-described module may store a program for causing the processor to function as the above-described one or more structural elements (in other words, a program for causing the processor to execute operations of the above-described one or more structural elements), and may execute the program. As another example, a program for causing the processor to function as the above-described one or more structural elements may be installed in the smartphone 900, and the wireless communication interface 913, the processor 901, and/or the auxiliary controller 919 may execute the program. As described above, the smartphone 900 or the above-described module may be provided as a device including the above-described one or more structural elements, and a program for causing the processor to function as the above-described one or more structural elements may be provided. Alternatively, a readable recording medium that stores the above-described program may be provided.

The smartphone 900 may operate as a wireless access point (software AP) by executing an access point function at an application level through the processor 901. Further, the wireless communication interface 913 may have a wireless access point function.

5.2. Second Application Example

FIG. 15 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD or a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another apparatus via a wireless LAN access point in an infrastructure mode. In addition, the wireless communication interface 933 can directly communicate with another apparatus in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation apparatus 920 may include a plurality of antennas, not limited to the example of FIG. 15. In that case, the antenna switches 934 may be omitted from the configuration of the car navigation apparatus 920.

The battery 938 supplies power to blocks of the car navigation apparatus 920 illustrated in FIG. 15 via feeder lines that are partially shown as dashed lines in the figure. The battery 938 accumulates power supplied from the vehicle.

In the car navigation apparatus 920 illustrated in FIG. 15, one or more structural elements (for example, at least either the memory unit 120 or the control unit 130) included in the WLAN terminal 100 described using FIG. 5 may be incorporated into the wireless communication interface 933. Moreover, at least some of these functions may be incorporated into the processor 921. As an example, a module including the wireless communication interface 933 and/or the processor 921 may be mounted in the car navigation apparatus 920, and the above-described one or more structural elements may be incorporated into this module. In this case, the above-described module may store a program for causing the processor to function as the above-described one or more structural elements (in other words, a program for causing the processor to execute operations of the above-described one or more structural elements), and may execute the program. As another example, a program for causing the processor to function as the above-described one or more structural elements may be installed in the car navigation apparatus 920, and wireless communication interface 933 and/or the processor 921 may execute the program. As described above, the car navigation apparatus 920 or the above-described module may be provided as a device including the above-described one or more structural elements, and a program for causing the processor to function as the above-described one or more structural elements may be provided. Alternatively, a readable recording medium that stores the above-described program may be provided.

In the car navigation apparatus 920 illustrated in FIG. 15, one or more structural elements (for example, at least either the memory unit 220, the subscriber identification module 230, or the control unit 240) included in the WWAN terminal 200 described using FIG. 6 may be incorporated into the wireless communication interface 933. Moreover, at least some of these functions may be incorporated into the processor 921. As an example, a module including wireless communication interface 933 and/or the processor 921 may be mounted in the car navigation apparatus 920, and the above-described one or more structural elements may be incorporated into this module. In this case, the above-described module may store a program for causing the processor to function as the above-described one or more structural elements (in other words, a program for causing the processor to execute operations of the above-described one or more structural elements), and may execute the program. As another example, a program for causing the processor to function as the above-described one or more structural elements may be installed in the car navigation apparatus 920, and wireless communication interface 933 and/or the processor 921 may execute the program. As described above, the car navigation apparatus 920 or the above-described module may be provided as a device including the above-described one or more structural elements, and a program for causing the processor to function as the above-described one or more structural elements may be provided. Alternatively, a readable recording medium that stores the above-described program may be provided.

The technology of the present disclosure may also be implemented as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. Conclusion

An embodiment of the present disclosure has been described above in detail referring to FIG. 1 to FIG. 15. As described above, the WWAN terminal 200B capable of connecting to the WWAN 300 to perform wireless communication assists connection by the WLAN terminal 100 to the WLAN 500 corresponding to the connection destination selection policy of the WWAN terminal 200A received via the WWAN 300. This allows the WLAN terminal 100 to connect to the WLAN 500 because of the assistance by the WWAN terminal 200B even when it is not easy to connect to the WLAN 500 individually or even via the WWAN terminal 200A. In this manner, the WLAN terminal 100 can connect to a network more easily.

The WWAN terminal 200B forms the WLAN 500 for oneself or causes the WLAN terminal 100 to connect to another WLAN 500, using the received connection destination selection policy. In any way, the WWAN terminal 200A does not perform tethering or relaying, which achieves a reduction in power consumption. Moreover, the WWAN terminal 200B does not perform tethering or relaying in the case of causing the WLAN terminal 100 to connect to another WLAN 500, which achieves a reduction in power consumption.

The WLAN terminal 100 can perform an authentication process to the WLAN 500 using subscriber identification information of the WWAN terminal 200A or subscriber identification information of the WWAN terminal 200B. Therefore, even when the WLAN terminal 100 does not have subscriber identification information, the Internet can be utilized. In addition, in the case of using subscriber identification information of the WWAN terminal 200B, a user of the WLAN terminal 100 may be able to utilize a service equivalent to or better than the service of one's own WWAN terminal 200A. For example, in the case where the communication speed of a service intended for the WWAN terminal 200B used by another person is 1 Mbps, the WLAN terminal 100 can utilize the service at 1 Mbps even if the communication speed of a service intended for its own WWAN terminal 200A is 500 kbps.

Moreover, a telecommunications carrier may provide the WWAN terminal 200B having permitted a request from the WLAN terminal 100 with an incentive, such as a discount on communication charges, and may carry out billing and settlement for the WLAN terminal 100. In this manner, the present technology can also contribute to monetization by a telecommunications carrier.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, FIG. 2 illustrates an example in which the WWAN terminal 200B serves as the base station 510, whilst the present technology is not limited to such an example. For example, a device serving as the base station 510 may be formed as a device separate from the WWAN terminal 200B.

Moreover, an example in which the WWAN terminal 200B is chosen on the basis of positional information of the WWAN terminal 200A has been explained in the above-described embodiment, whilst the present technology is not limited to such an example. For example, the WWAN terminal 200B may be selected on the basis of a connection destination selection policy of the WWAN terminal 200A. For example, a WWAN terminal 200 having a similar connection destination selection policy or a WWAN terminal 200 close to a position indicated by information included in the connection destination selection policy may be chosen as the WWAN terminal 200B.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A wireless communication apparatus including:

a first wireless communication unit configured to connect to a first network to perform wireless communication; and a control unit configured to assist connection, to a second network corresponding to a connection destination selection policy of another wireless communication apparatus received by the first wireless communication unit, by a wireless terminal related to the other wireless communication apparatus.

(2)

The wireless communication apparatus according to (1), further including:

a second wireless communication unit configured to form the second network to perform wireless communication with the wireless terminal, in which the control unit controls the second wireless communication unit to form the second network in a case where the connection destination selection policy is received.

(3)

The wireless communication apparatus according to (2), in which the connection destination selection policy includes information concerning a communication scheme, priority, and identification information.

(4)

The wireless communication apparatus according to (3), in which the control unit controls the second wireless communication unit to form the second network using high-priority identification information included in the connection destination selection policy.

(5)

The wireless communication apparatus according to any one of (2) to (4), in which the second wireless communication unit forms the second network as an access point of a wireless LAN or as a P2P Group Owner of Wi-Fi Direct (registered trademark).

(6)

The wireless communication apparatus according to any one of (2) to (5), in which the control unit controls the first wireless communication unit and the second wireless communication unit to relay communication between the wireless terminal and the first network.

(7)

The wireless communication apparatus according to (1), in which the control unit selects a connection destination of the wireless terminal on the basis of the connection destination selection policy.

(8)

The wireless communication apparatus according to (7), in which the control unit selects the connection destination of the wireless terminal further on the basis of the connection destination selection policy of the wireless communication apparatus.

(9)

The wireless communication apparatus according to (7) or (8), in which the first wireless communication unit receives link information used for establishing a link with the wireless terminal.

(10)

The wireless communication apparatus according to (9), in which the link information includes identification information for identifying the wireless terminal.

(11)

The wireless communication apparatus according to (9) or (10), further including:

a storage unit configured to store subscriber identification information for the first network; and a third wireless communication unit configured to perform wireless communication with the wireless terminal using the link information, in which the control unit generates authentication information for extensible authentication protocol (EAP) authentication to the second network by the wireless terminal using the subscriber identification information stored in the storage unit, and transmits the authentication information to the wireless terminal by the third wireless communication unit.

(12)

The wireless communication apparatus according to any one of (1) to (11), in which the first network is a mobile communication network, and the second network is a public wireless LAN.

(13)

A wireless communication apparatus including:

a first wireless communication unit configured to connect to a first network to perform wireless communication; and a control unit configured to control the first wireless communication unit to transmit a connection destination selection policy via the first network to another wireless communication apparatus that assists connection to a second network by a wireless terminal related to the other wireless communication apparatus.

(14)

The wireless communication apparatus according to (13), in which in a case where the second network exists in a neighborhood, the control unit controls the first wireless communication unit to transmit link information used for establishing a link with the wireless terminal.

(15)

The wireless communication apparatus according to (13) or (14), further including:

a storage unit configured to store subscriber identification information for the first network; and a third wireless communication unit configured to perform wireless communication with the wireless terminal, in which the control unit generates authentication information for EAP authentication to the second network by the wireless terminal using the subscriber identification information stored in the storage unit, and transmits the authentication information to the wireless terminal by the third wireless communication unit.

(16)

The wireless communication apparatus according to any one of (13) to (15), in which the control unit controls the first wireless communication unit to transmit positional information of the wireless communication apparatus.

(17)

A wireless communication method including:

with a wireless communication apparatus configured to connect to a first network to perform wireless communication, assisting connection, to a second network corresponding to a received connection destination selection policy of another wireless communication apparatus, by a wireless terminal related to the other wireless communication apparatus.

(18)

A wireless communication method including:

with a wireless communication apparatus configured to connect to a first network to perform wireless communication, transmitting a connection destination selection policy via the first network to another wireless communication apparatus that assists connection to a second network by a wireless terminal related to the other wireless communication apparatus.

(19)

A program for causing a computer to function as:
a first wireless communication unit configured to connect to a first network to perform wireless communication; and
a control unit configured to assist connection, to a second network corresponding to a connection destination selection policy of another wireless communication apparatus received by the first wireless communication unit, by a wireless terminal related to the other wireless communication apparatus.

(20)

A program for causing a computer to function as:
a first wireless communication unit configured to connect to a first network to perform wireless communication; and
a control unit configured to control the first wireless communication unit to transmit a connection destination selection policy via the first network to another wireless communication apparatus that assists connection to a second network by a wireless terminal related to the other wireless communication apparatus.

REFERENCE SIGNS LIST 1 wireless communication system
100 WLAN terminal
110 wireless communication unit
112 WLAN module
114 BT module
116 NFC module
120 memory unit
130 control unit
200 WWAN terminal
210 wireless communication unit
212 WWAN module
214 WLAN module
216 BT module
218 NFC module
220 memory unit
230 subscriber identification module
240 control unit
300 WWAN
310 base station
320 gateway
330 subscriber information server
340 authentication server
341 communication unit
342 memory unit
343 control unit
350 network information providing server
400 service network
500 WLAN
510 base station

The invention claimed is:

1. A first wireless communication apparatus, comprising:
first wireless communication circuitry configured to:
receive SSID information for a first network from a second wireless communication apparatus based on user information of one of the first wireless communication apparatus or the second wireless communication apparatus; and
control circuitry configured to:
receive a user input that indicates a permission to assist a connection between a wireless terminal and the second wireless communication apparatus, wherein the first wireless communication circuitry is further configured to:
transmit a connection request to the wireless terminal based on the user input;
establish, in a second network, a direct wireless connection between the first wireless communication apparatus and the wireless terminal based on the connection request; and
the control circuitry is further configured to:
assist the direct wireless connection based on transmission, to the wireless terminal, of the user information of one of the first wireless communication apparatus or the second wireless communication apparatus, the SSID information for the first network, and authentication information, wherein
the first network is associated with the second wireless communication apparatus.

2. The first wireless communication apparatus according to claim 1, further comprising
second wireless communication circuitry configured to communicate, by wireless communication, with the wireless terminal, wherein
the control circuitry is further configured to control the second wireless communication circuitry, in the first network, based on a receipt of a connection destination selection policy, and
the connection destination selection policy includes information associated with a communication scheme, priority, and identification information.

3. The first wireless communication apparatus according to claim 2, wherein
the second wireless communication circuitry is further configured to establish the first network as one of an access point of a wireless LAN or a P2P Group Owner of Wi-Fi Direct (registered trademark).

4. The first wireless communication apparatus according to claim 2, wherein
the control circuitry is further configured to control the first wireless communication circuitry and the second wireless communication circuitry to relay communication between the wireless terminal and the second network.

5. The first wireless communication apparatus according to claim 1, wherein
the control circuitry is further configured to select a connection destination of the wireless terminal based on a connection destination selection policy, and
the connection destination selection policy includes information associated with a communication scheme, priority, and identification information.

6. The first wireless communication apparatus according to claim 5, wherein
the control circuitry is further configured to select the connection destination of the wireless terminal further based on the connection destination selection policy of the first wireless communication apparatus.

7. The first wireless communication apparatus according to claim 5, wherein
the first wireless communication circuitry is further configured to:
receive link information from the wireless terminal; and
establish a communication link with the wireless terminal based on the link information.

8. The first wireless communication apparatus according to claim 7, wherein the control circuitry is further configured to identify the wireless terminal based on identification information, and the identification information is based on the link information.

9. The first wireless communication apparatus according to claim 7, further comprising:

a memory configured to store subscriber identification information for the second network; and third wireless communication circuitry configured to:

communicate, by wireless communication, with the wireless terminal based on the link information, wherein the control circuitry is further configured to generate the authentication information based on the subscriber identification information, and the generated authentication information corresponds to extensible authentication protocol (EAP) authentication to the first network by the wireless terminal; and transmit the generated authentication information to the wireless terminal.

10. The first wireless communication apparatus according to claim 1, wherein the second network is a mobile communication network, and the first network is a public wireless LAN.

11. The first wireless communication apparatus according to claim 1, further comprising a display screen, wherein the control circuitry is further configured to:

control the display screen to display a user interface (UI); and receive the user input via the displayed UI.

12. A first wireless communication apparatus, comprising:

first wireless communication circuitry configured to:

receive SSID information for a first network from a second wireless communication apparatus based on user information of one of the first wireless communication apparatus or the second wireless communication apparatus; and control circuitry configured to:

receive a user input that indicates a permission to assist a connection between a wireless terminal and the second wireless communication apparatus, wherein the first wireless communication circuitry is further configured to:

establish a direct wireless connection, in a second network, between the first wireless communication apparatus and the wireless terminal based on the user input; and the control circuitry is further configured to:

assist the direct wireless connection based on transmission, to the wireless terminal, of the user information of one of the first wireless communication apparatus or the second wireless communication apparatus, the SSID information for the first network, and authentication information, wherein the first network is associated with the second wireless communication apparatus; and to control the first wireless communication circuitry to transmit, via the second network, a connection destination selection policy to a third wireless communication apparatus, wherein the third wireless communication apparatus:

assists the connection, in the first network, between the wireless terminal and the second wireless communication apparatus.

13. The first wireless communication apparatus according to claim 12, wherein the control circuitry is further configured to control the first wireless communication circuitry to establish a communication link with the wireless terminal, the communication link is established based on the first network, and the first network exists in a neighborhood.

14. The first wireless communication apparatus according to claim 12, further comprising:

a memory configured to store subscriber identification information for the second network; and second wireless communication circuitry configured to:

establish wireless communication with the wireless terminal, wherein the control circuitry is further configured to generate the authentication information based on the subscriber identification information, and the authentication information corresponds to extensible authentication protocol (EAP) authentication to the first network by the wireless terminal; and transmit the authentication information to the wireless terminal.

15. The first wireless communication apparatus according to claim 12, wherein the control circuitry is further configured to control the first wireless communication circuitry to transmit positional information of the first wireless communication apparatus.

16. A wireless communication method, comprising:

in a first wireless communication apparatus:

receiving SSID information for a first network from a second wireless communication apparatus based on user information of one of the first wireless communication apparatus or the second wireless communication apparatus;

receiving a user input that indicates a permission to assist a connection between a wireless terminal and the second wireless communication apparatus;

transmitting a connection request to the wireless terminal based on the user input;

establishing a direct wireless connection, in a second network, between the first wireless communication apparatus and the wireless terminal based on the connection request; and assisting the direct wireless connection based on transmission, to the wireless terminal, of the user information of one of the first wireless communication apparatus or the second wireless communication apparatus, the SSID information for the first network, and authentication information, wherein the first network is associated with the second wireless communication apparatus.

17. A wireless communication method, comprising:

receiving SSID information for a first network from a second wireless communication apparatus based on user information of one of a first wireless communication apparatus or the second wireless communication apparatus;

receiving a user input that indicates a permission to assist a connection between a wireless terminal and the second wireless communication apparatus;

transmitting a connection request to the wireless terminal based on the user input;

establishing a direct wireless connection, in a second network, between a first wireless communication apparatus and the wireless terminal based on the connection request;

assisting the direct wireless connection based on transmission, to the wireless terminal, of the user information of one of the first wireless communication apparatus or the second wireless communication apparatus, the SSID information for the first network, and authentication information, wherein the first network is associated with the second wireless communication apparatus; and transmitting a connection destination selection policy via the second network to a third wireless communication apparatus, wherein the third wireless communication apparatus:

assists the connection between the wireless terminal and the second wireless communication apparatus in the first network.

18. A non-transitory computer-readable medium having stored thereon computer-executable instructions, which when executed by a computer, cause the computer to execute operations, the operations comprising:

receiving SSID information for a first network from a second wireless communication apparatus based on user information of one of a first wireless communication apparatus or the second wireless communication apparatus;

receiving a user input that indicates a permission to assist a connection between a wireless terminal and the second wireless communication apparatus;

transmitting a connection request to the wireless terminal based on the user input;

establishing a direct wireless connection, in a second network, between the first wireless communication apparatus and the wireless terminal based on the connection request; and assisting the direct wireless connection based on transmission, to the wireless terminal, of the user information of one of the first wireless communication apparatus or the second wireless communication apparatus, the SSID information for the first network, and authentication information, wherein the first network is associated with the second wireless communication apparatus.

19. A non-transitory computer-readable medium having stored thereon computer-executable instructions, which when executed by a computer, cause the computer to execute operations, the operations comprising:

receiving SSID information for a first network from a second wireless communication apparatus based on user information of one of a first wireless communication apparatus or the second wireless communication apparatus;

receiving a user input that indicates a permission to assist a connection between a wireless terminal and the second wireless communication apparatus;

transmitting a connection request to the wireless terminal based on the user input;

establishing a direct wireless connection, in a second network, between the first wireless communication apparatus and the wireless terminal based on the connection request;

assisting the direct wireless connection based on transmission, to the wireless terminal, of the user information of one of the first wireless communication apparatus or the second wireless communication apparatus, the SSID information for the first network, and authentication information, wherein the first network is associated with the second wireless communication apparatus; and transmitting a connection destination selection policy via the second network to a third wireless communication apparatus, wherein the third wireless communication apparatus:

assists the connection between the wireless terminal and the second wireless communication apparatus in the first network.

\* \* \* \* \*